FIG. 8a
FIG. 8b
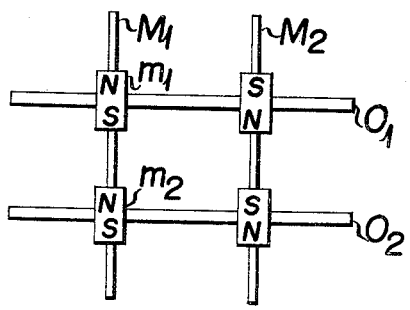
FIG. 8c
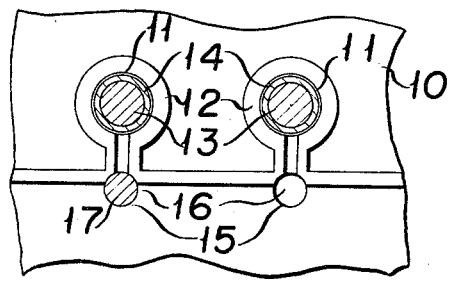
FIG. 9a
FIG. 9b
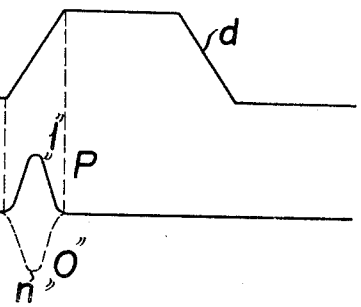
FIG. 11a
FIG. 11b
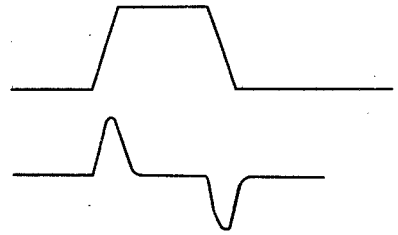
FIG. 11c
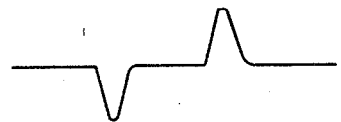
FIG. 12
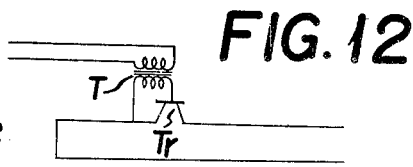

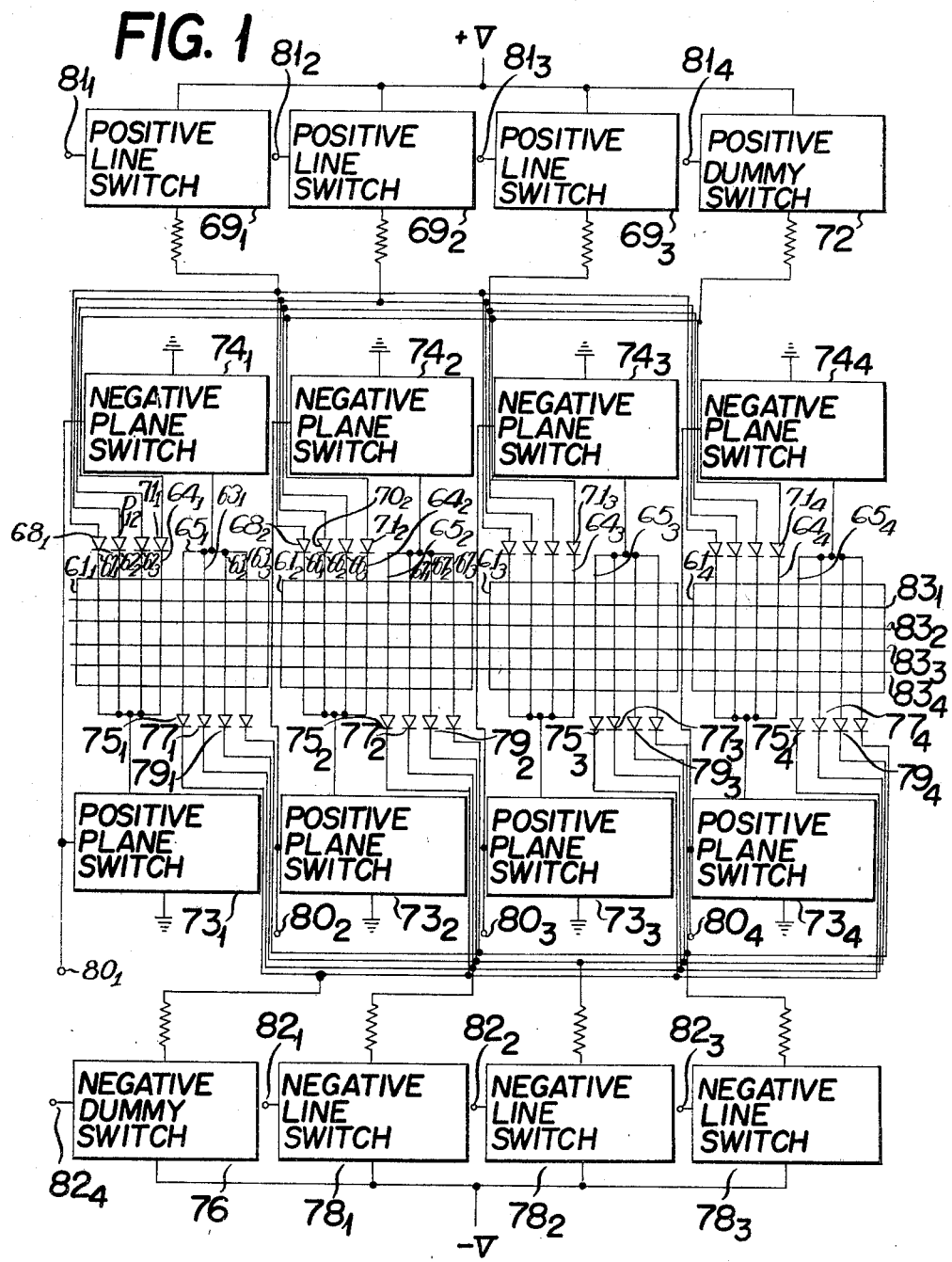

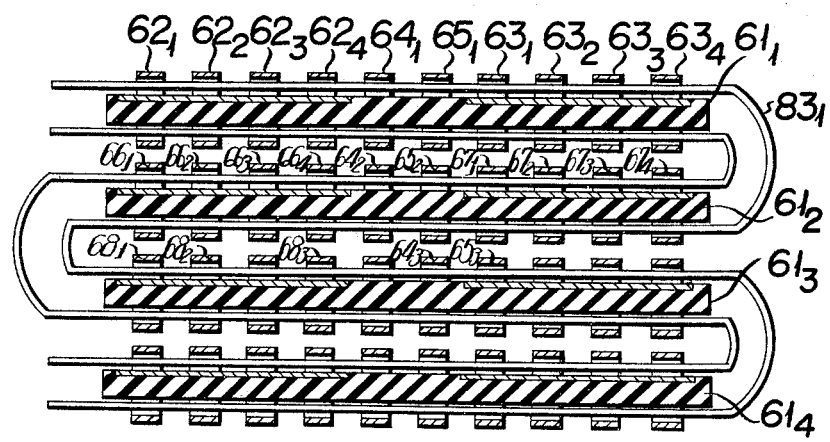
FIG. 4
FIG. 6
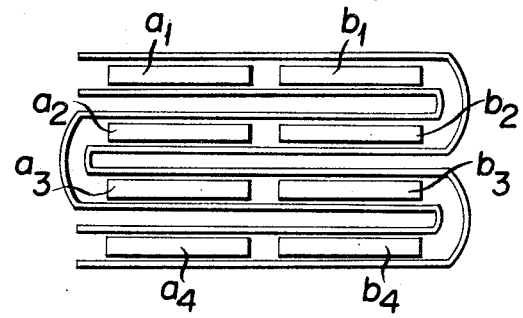
FIG. 7a    FIG. 7b
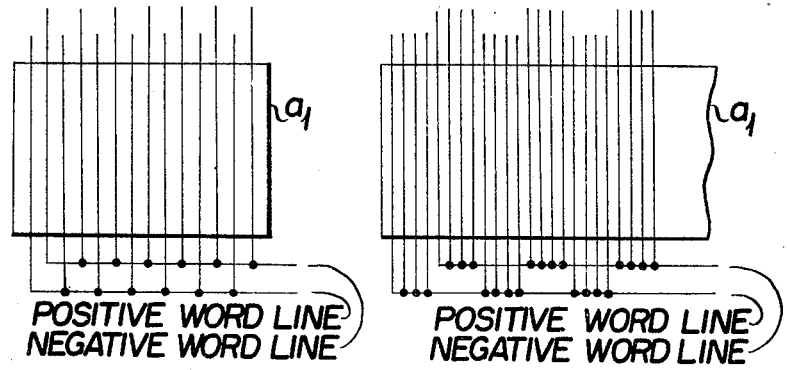

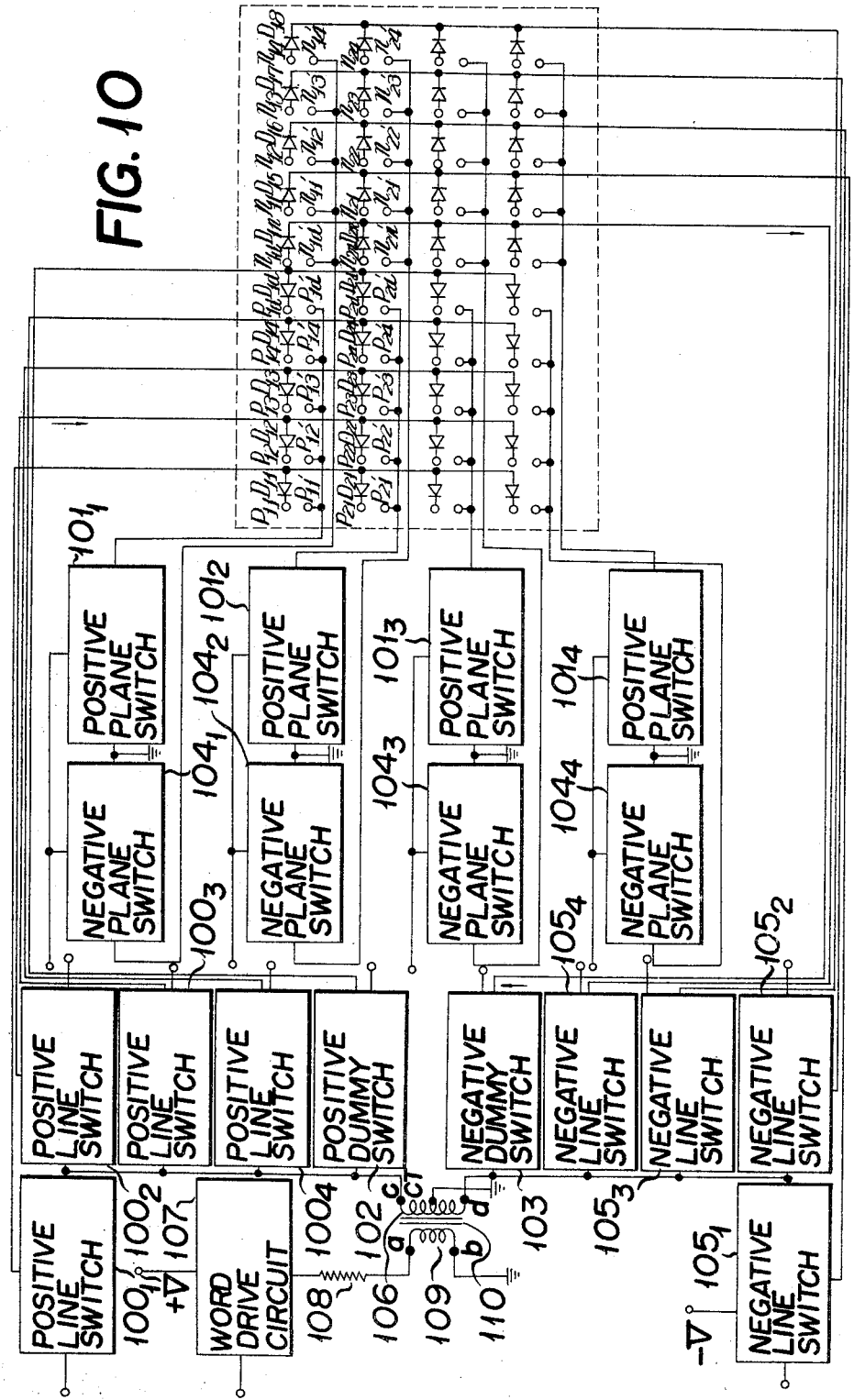

United States Patent Office 3,510,853
Patented May 5, 1970

3,510,853
WORD DRIVE LINE ARRANGEMENT FOR CANCELLATION OF SPURIOUS NOISE
Norio Tanaka, Tokyo, Satoshi Negishi, Kawasaki-shi, and Einosin Itamura, Tokyo, Japan, assignors to Tokyo Shibaura Electric Co., Ltd., Kawasaki-shi, Japan, a corporation of Japan
Filed May 10, 1967, Ser. No. 637,541
Claims priority, application Japan, May 14, 1966, 41/30,338; June 8, 1966, 41/36,563; Sept. 27, 1966, 41/63,188, 41/63,189, 41/63,190; Oct. 31, 1966, 41/71,618, 41/71,619, 41/71,620, 41/71,621, 41/71,622
Int. Cl. G11c 7/02, 11/06
U.S. Cl. 340—174
14 Claims

ABSTRACT OF THE DISCLOSURE

One of a plurality word lines juxtaposed on a memory plane is selectively driven concurrently with the selective driving of one dummy word line provided on the same memory plane whereby to generate voltages of opposite polarities or to pass currents in the opposite directions thus decreasing noise voltage induced in the output line by the word line.

---

This invention relates to a memory device utilizing magnetic memory elements and more particularly to a word selection type memory device in which informations are treated in the form of words consisting of combinations of plurality of bits.

The memory devices of the type referred to the above are generally utilized as high speed memory devices in electronic computers.

The word selection type memory device usually comprises a unit memory plane consisting of, for example, a thin insulator substrate or base board, a plurality of spaced parallel word drive lines which are disposed on the substrate in one direction, for example, in the direction of lines of a matrix, a plurality of spaced parallel output lines which are insulated from said word drive lines and disposed substantially at right angles with respect thereto or in the direction of columns and a plurality of magnetic memory elements, for example ferrite annular magnetic cores or vapor deposited magnetic spots at each cross point between the word drive line and the output line. A plurality of unit memory planes are stacked in layers and word driving lines at corresponding positions of respective unit memory planes are interconnected to form a word selection type memory device.

When a word drive current is passed through a selected one of said plurality of word drive lines electric currents corresponding to the memory states of respective cross points will be induced in all output lines intersecting with said selected word drive line whereby the stored informations are read out in parallel on respective output lines. Each of the outputs formed in this manner is generally identified as either the binary "1" or "0" dependent upon its polarity, amplitude or phase, and one or several words are read out by the combination of outputs of respective output lines.

Thus the flow of current through a selected word drive line will create in output lines current corresponding to the stored information.

It is presumed that such a transient voltage is caused by such factors as the impedance of a plane switching circuit that has selected said particular word select line, the line impedance between said selected word drive line and the plane switching circuit, the impedance of said selected word drive line, and the impedances of a line between said word drive line and a line switch connected on the opposite side of the plane switching circuit with respect to said word drive line and of a diode.

Thus the transient voltage created at each cross point between said selected word drive line and each of said output lines will be transmitted to each of the output lines through an electrostatic capacitance existing at each cross point. Further since said plane switching circuits are usually connected in comomn to a plurality of word drive lines in a unit memory plane including said selected word drive line the induced transient voltage will be coupled to respective output lines also through these word drive lines. Similarly the output terminal of said line switching circuit is also connected in parallel to a plurality of diode groups of the unit memory plane including said diode so that the transient voltage induced in a circuit between said diode and the line switching circuit will be coupled to the output line through each of the other diodes. Because the diodes other than that connected to the selected word drive line are in the nonconductive state the transient voltage will be coupled to the output line as the noise component through the electrocapacitance at the coupling portions of the diodes.

In this manner as noise components due to various causes are coupled to output lines, where the output signal is small, the signal to noise ratio would become extremely poor thus resulting in the decrease in the reliability of the memory device.

It is an object of this invention to eliminate various difficulties mentioned above and to improve the signal to noise ratio by decreasing the magnitude of the noise components caused by the transient voltage thus providing a reliable word selection type memory device.

According to this invention there is provided a novel word selection type memory device comprising a plurality of memory planes, each of said memory planes including a plurality of juxtaposed normal word lines, at least one dummy word line, a plurality of output lines disposed to intersect with said normal word lines and said dummy word line substantially at right angles, and a plurality of magnetic memory elements each provided at the cross point between each of said normal word lines and each of said output lines, said output lines provided for each memory plane being connected in series for each bit, said normal word lines and said dummy line being connected to a word selection drive means, said word selection drive means serving to selectively drive one of said normal word lines concurrently with the selective driving of the dummy word line in a memory plane containing said selectively driven normal word line, said selecting driven normal word line and said dummy word line being arranged such that noise voltages induced in the respective output lines from said selectively driven normal word line, said dummy word line and both two word lines in the half-selected state of other memory planes connected to said selectively driven normal word line and said dummy word line having opposite polarities and substantially the same waveform thus decreasing the noise voltage induced in the output lines.

The invention can be more fully understood from the following detailed description taken in connection with the accompanying drawings, in which:

FIG. 1 is a circuit diagram to illustrate one embodiment of this invention;

FIG. 4 is a sectional view of a stack comprising a plurality of stacked memory planes shown in FIG. 3;

FIG. 6 is a schematic representation of another example of the stack;

FIGS. 7a and 7b are diagrammatic representations of the arrangement of word lines according to this invention;

FIGS. 8a and 8b show a sectional view and a plan view of a portion of a modified memory plane embodying this invention;

FIG. 8c is a partial view illustrating a portion of a still modified memory plane embodying this invention;

FIGS. 9a and 9b are waveforms to explain the operation of the memory plane shown in FIGS. 8a and 8b;

FIG. 10 is a connection diagram of another example of the word selection drive circuit constructed in accordance with this invention;

FIGS. 11a, 11b and 11c show signal waveforms to explain the operation of the circuit shown in FIG. 10;

FIG. 12 shows a connection diagram of one example of the plane switching circuit shown in FIG. 10;

Figure 2A:
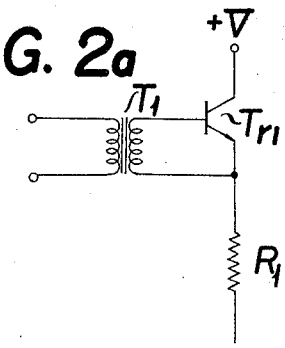
FIGS. 2a, 2b and 2c are connection diagrams to illustrate examples of the line switching circuit and a plane switching circuit employed in this invention.

Preferred embodiments of this invention will now be described in detail by referring to the accompanying drawings. As shown in FIG. 1 which shows the connection diagram of a word selection type memory device embodying this invention, the memory device comprises a plurality of, for example, four unit memory planes $61_1$, $61_2$, $61_3$ and $61_4$. The word drive lines for the unit memory plane $61_1$ is divided into two groups, viz. the positive word line group $62_1$, $62_2$ and $62_3$ and the negative word line group $63_1$, $63_2$ and $63_3$. Further a single positive dummy word line $64_1$ is associated with the positive word line group and a single negative dummy word line $65_1$ is associated with the negative word line group. Similarly, in the unit memory plane $61_2$, the word drive lines thereof are divided into the positive word line group $66_1$, $66_2$ and $66_3$ and the negative word line group $67_1$, $67_2$ and $67_3$. Further one positive dummy line $64_2$ is associated with the positive word line group while one negative dummy line $65_2$ is associated with the negative word line group. Other unit memory planes $61_3$ and $61_4$ are constructed similarly. The positive word line groups of said unit memory planes $61_1$, $61_2$, $61_3$ and $61_4$ are respectively connected to a positive line switching circuit $69_1$ through respective diodes $68_1$, $68_2$ . . . . Similarly the positive word groups $62_1$, $62_2$ . . . associated with said unit memory planes $61_1$, $61_2$, $61_3$ and $61_4$ are connected to a positive line switching circuit $69_2$ respectively through diodes $70_1$, $70_2$ . . . . In the same manner the positive word line groups associated with said unit memory planes $61_1$, $61_2$ . . . are connected to a positive line switching circuit $69_2$ respectively through diodes. The positive dummy lines $64_1$, $64_2$, $64_3$ and $64_4$ are connected to a positive dummy switching circuit 72 respectively through diodes $71_1$, $71_2$, $71_3$ and $71_4$.

The opposite ends of the positive word line groups $62_1$, $62_2$, $62_3$, $64_1$, $66_1$, $66_2$, $66_3$ and $64_2$ . . . associated with said unit memory planes are commonly connected and thence to positive plane switching circuits $73_1$, $73_2$, $73_3$ and $73_4$, respectively.

The opposite ends of the negative word line groups $63_1$, $63_2$, $63_3$, $65_1$ . . . , $65_2$, $67_1$, $67_2$, $67_3$ . . . associated with said unit memory planes $61_1$, $61_2$, $61_3$ and $61_4$ are commonly connected and thence to the negative plane switching circuits $74_1$, $74_2$, $74_3$ and $74_4$, respectively. Likewise the opposite ends of the negative dummy word lines $65_1$, $65_2$, $65_3$ and $65_4$ are connected to a negative dummy switching circuit 76 respectively through diodes $75_1$, $75_2$, $75_3$ and $75_4$. The negative word lines associated with said unit memory planes $61_1$, $61_2$, $61_3$ and $61_4$ are connected to a negative switching circuit $78_1$ respectively through diodes $77_1$, $77_2$ . . . . In the same manner the negative word line groups $63_2$, $67_3$ . . . associated with the unit memory planes $61_1$, $61_2$, $61_3$ and $61_4$ are connected to negative line switching circuit $78_2$ respectively through diodes $79_1$, $79_2$ . . . . The positive plane switching circuit $73_1$ and the negative plane switching circuit $74_1$ are provided with a common input terminal $80_1$ while the positive plane switching circuit $73_2$ and the negative plane switching circuit $74_2$ are provided with a common input terminal $80_2$. In the same manner, input terminals $80_3$ and $80_4$ are provided. Input terminals $81_1$, $81_2$, $81_3$ and $81_4$ are provided respectively for said positive line switching circuits $69_1$, $69_2$ and $69_3$ and the positive line switching circuit 72, one terminal of these switching circuits being connected to the positive pole of (+V) volt of a DC source. Similarly input terminals $82_1$, $82_2$, $82_3$ and $82_4$ are respectively provided for said negative line switching circuits $78_1$, $78_2$ and $78_3$ and the negative dummy line switching circuit 76, one terminal of these switching circuits being connected to the negative pole of (−V) volt of the DC source. The memory device further includes a plurality of, for example four, output lines which are disposed to intersect substantially at right angles with the word drive lines associated with said unit memory planes, the output lines being insulated from the word drive lines and also being utilized for writing informations.

Figure 2B:
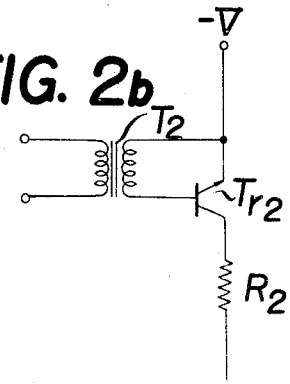
Figure 2C:
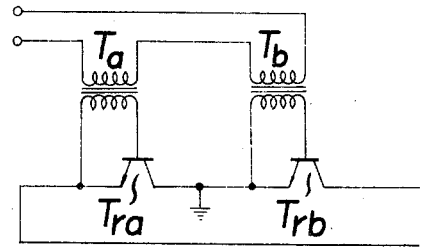

FIG. 2a shows an example of a positive line switching circuit, FIG. 2b an example of a negative line switching circuit and FIG. 2c an example of a positive-negative plane switching circuit. As shown, the positive and negative line switching circuits are constructed such that transistors $Tr_1$ and $Tr_2$ are respectively driven by pulse transformers $T_1$ and $T_2$. Further, as the positive-negative plane switching circuit is always selected as a pair of positive and negative circuits it is possible to simplify circuit arrangement by utilizing a transistor circuit driven by a pulse transformer with a common input.

More particularly, in the switching circuit shown in FIG. 2a, a positive input pulse signal is applied to the primary winding of the pulse transformer $T_1$. The secondary winding of the pulse transformer $T_1$ is connected between the base and emitter electrodes of a transistor $Tr_1$ to forwardly bias the same by the input pulse signal, whereby to supply a positive word drive current to a positive word line group through a resistor $R_1$. The negative line switching circuit shown in FIG. 2b is substantially the same as that shown in FIG. 2a except that the word drive current flows in the opposite direction. As shown in FIG. 2c, the positive-negative plane switching circuit comprises two serially connected transistors $Tr_a$ and $Tr_b$ with the common junction grounded. Secondary windings of a pair of pulse transformers $T_a$ and $T_b$ are connected across the base and emitter electrodes of respective transistors $Tr_a$ and $Tr_b$, the primary winding of pulse transformers $T_a$ and $T_b$ being connected in series to be supplied with a common input pulse signal. The emitter electrode of the transistor $Tr_a$ and the collector electrode of the transistor $Tr_b$ are connected to positive and negative line switching circuits respectively through positive and negative word line groups.

The operation of the circuit shown in FIG. 1 is as follows: If it is assumed now that input signals are simultaneously applied to the positive line switching circuit $69_3$, the positive plane switching circuit $73_2$, the negative dummy line switching circuit 76 and the negative plane switching circuit $74_2$, then the positive word line $66_3$ on the unit memory plane $61_2$ will be selected to read out the content thereof. In this case the negative dummy word line $65_2$ formed on the same unit memory plane $61_2$ will also be selected and driven. Binary informations on the output lines $83_1$, $83_2$, $83_3$ and $83_4$ are generated by magnetic means such as ferrite cores disposed at cross points between the said positive word line $66_3$ and the output lines $83_1$, $83_2$, $83_3$ and $83_4$, so that the word noise component coupled from the positive word line group and that from the negative word line group cancel each other, thus greatly reducing the magnitude of the net noise components.

This cancelling of word noise voltage components will be considered in more detail. One of the word noise voltage components is a positive noise voltage component which flows into the output lines $83_1$ to $83_4$ from the positive word lines $62_3$, $66_3$ ... which are connected to the positive line switching circuit $69_3$ via respective diodes. The other component is a negative noise voltage component which flows into the output lines $83_1$, $83_2$, $83_3$ and $83_4$ from the negative dummy word lines connected to the negative dummy line switching circuit 76 through respective diodes. Since these positive and negative noise voltage components have opposite polarities they cancel each other and disappear. Thus each one of the word lines coupled with the positive line switching circuit $69_2$ and each one of dummy word lines coupled to the negative dummy line switching circuit 76 are provided for each one of said unit memory planes $61_2$ through $61_4$. The spacing between said word line and the dummy word line is selected to be shorter than the length of the output line in one unit memory plane so that transmission time therebetween can be neglected with the result that the positive noise voltage component from the positive line switching circuit and the negative noise voltage component from the negative dummy line switching circuit will have substantially the same wave shape of opposite polarity thus ensuring positive elimination. Similarly on the plane switch side, the positive noise voltage component coupled to the output lines $83_1$, $83_2$, $83_3$ and $83_4$ from the positive word lines $66_1$, $66_2$, and $66_3$ which are connected to the positive plane switching circuit $73_2$ through respective diodes cancels the negative noise voltage component supplied to the output lines $83_1$, $83_2$, $83_3$ and $83_4$ from the negative word lines $67_1$, $67_2$ and $67_3$ which are connected to the negative plane switching circuit $74_2$ through respective diodes. When one word is to be selected from the negative word line group the negative and positive polarities described in the above description may be exchanged.

Figure 3:
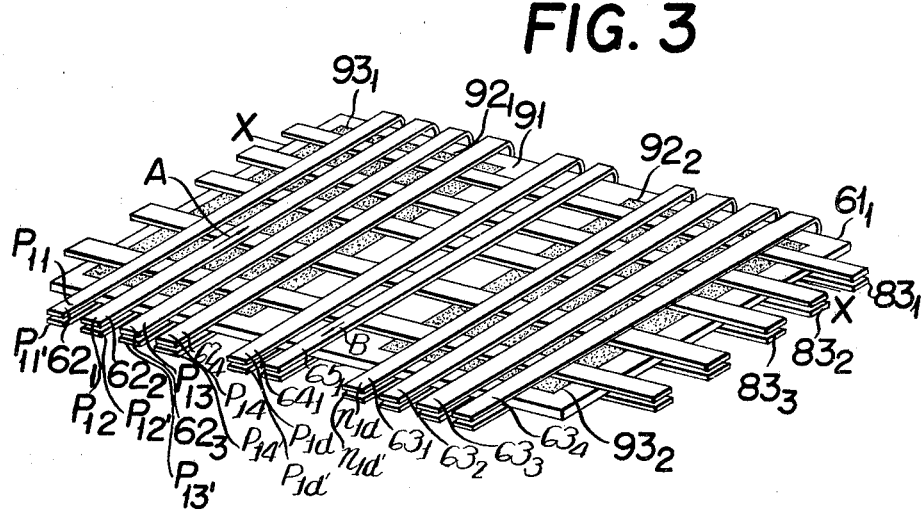
FIG. 3 is a perspective view showing a memory plane embodying this invention.

FIG. 3 shows a modified embodiment of this invention wherein flat sheet type magnetic film memory elements are employed and wherein the directions of flow of driving currents are opposite in the positive word line group and in the negative word line group. For the sake of simplicity, portions shown in FIG. 1 are designated by the same reference numerals. The arrangements of the line switching circuit and of the plane switching circuit are the same for both positive word lines and negative word lines. With this arrangement the direction of current flowing through a selected word line becomes opposite in the positive and negative word lines. With reference to the word noise components, in the embodiment shown in FIG. 1 as these components are coupled to the opposite ends of the positive and negative word lines on the insulator substrate their magnitudes differ more or less. However in the embodiment shown in FIG. 3 as the positive and negative word lines are driven from terminals on the same side positive and negative transient voltages created at cross points between a particular output line and word lines would become perfectly symmetrical, whereby elimination of word noise components is effected perfectly and the utility of the memory device is greatly improved.

More particularly, as shown in FIG. 3 recesses $92_1$ and $92_2$ are formed on one or both sides (one side in the illustrated construction) of an insulator substrate 91 of the unit memory plane $61_1$, for example, and flat sheet shaped magnetic memory elements $93_1$ and $93_2$ are deposited in the recesses $92_1$ and $92_2$ by any suitable well known technique, vapor deposition for instance. A plurality of (for example five) combination write and output lines $83_1$, $83_2$, $83_3$, $83_4$ and $83_5$ are juxtaposed on these memory elements $93_1$ and $93_2$ and a plurality of (for example four) positive word lines $62_1$, $62_2$, $62_3$ and $62_4$ are arranged on the memory element $93_1$ at substantially right angles with respect to the output lines $83_1$ through $83_5$. Similarly four negative word lines $63_1$, $63_2$, $63_3$ and $63_4$ are disposed on the memory element $93_2$ at substantially right angles with respect to said output lines $83_1$ through $83_5$ and electrically insulated therefrom. A single positive dummy word line $64_1$ and a single negative dummy word line $65_1$ are disposed on the insulator substrate 91 between said memory elements $93_1$ and $93_2$.

One terminals $P_{11}$, $P_{12}$, $P_{13}$ and $P_{14}$ of the positive word lines $62_1$, $62_2$, $62_3$ and $62_4$ are connected to the positive line switching circuit through respective diodes (not shown) whereas opposite terminals $P'_{11}$, $P'_{12}$, $P'_{13}$ and $P'_{14}$ of these positive word lines are connected to the positive word plane switching circuit. One terminal $P_{1d}$ of the positive dummy word line $64_1$ is connected to the positive dummy line switching circuit through a diode while the other terminal $P'_{1d}$ to the positive plane switching circuit. One terminal $N_{1d}$ of the negative dummy word line $65_1$ is connected to the negative line switching circuit through a diode while the other terminal $N'_{1d}$ to the negative plane switching circuit. Likewise one terminals of the negative word lines $63_1$, $63_2$, $63_3$ and $63_4$ are respectively connected to the negative line switching circuit through respective diodes and the other terminals thereof to the plane switching circuit.

Figure 5:
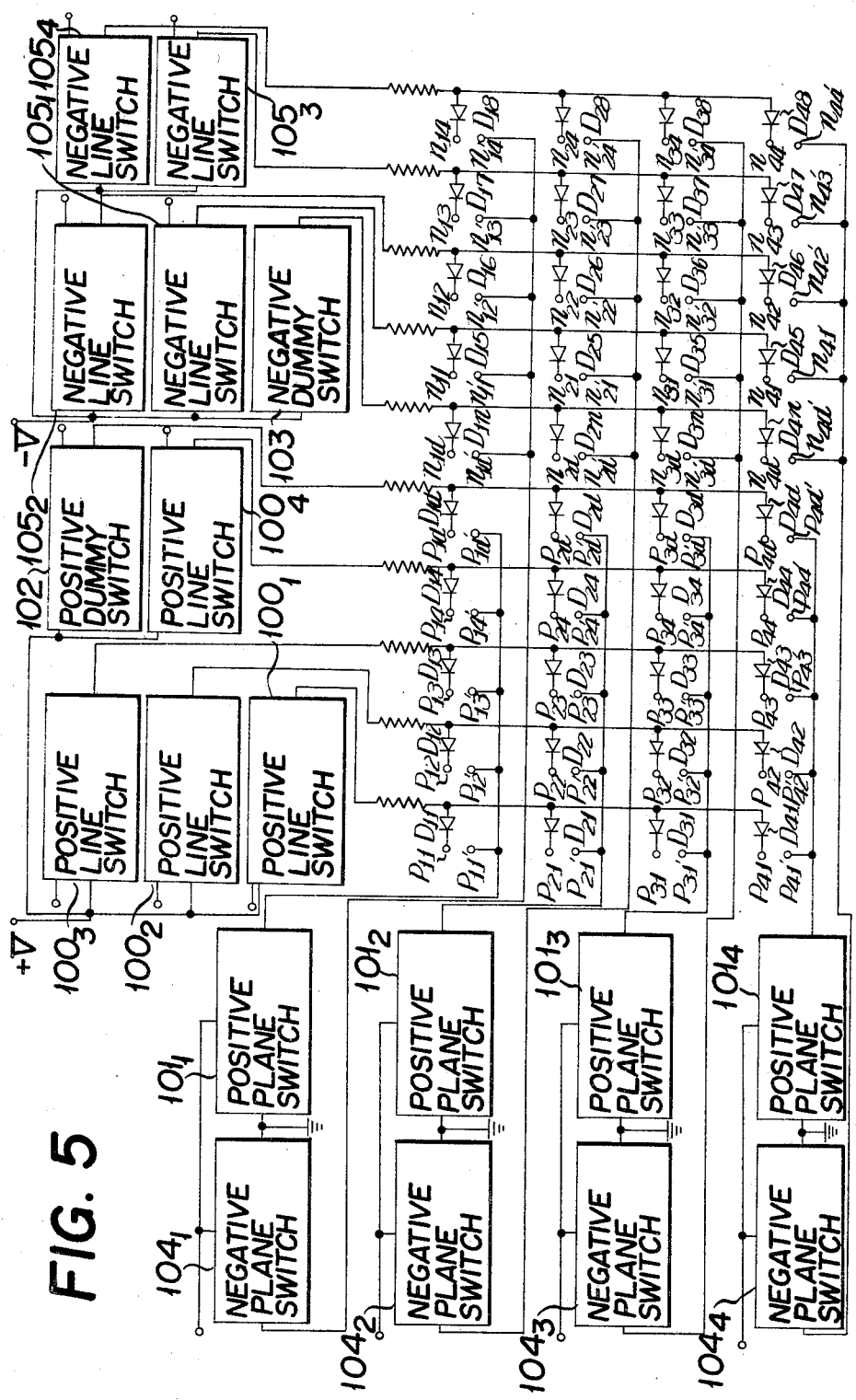
FIG. 5 shows a connection diagram of another example of the word selection drive circuit embodying this invention.

Four unit memory planes constructed as above described are stacked one upon the other as shown in FIG. 4 to form a laminated structure. The line switching circuit connected to word lines in the stack shown in FIG. 4 is diagrammatically illustrated in FIG. 5. More specifically, one terminals $P_{11}$, $P_{12}$, $P_{13}$ and $P_{14}$ of the positive word lines $62_1$, $62_2$, $62_3$ and $62_4$ provided for each unit memory plane are connected to positive line switching circuits $100_1$ through $100_4$ respectively through diodes $D_{11}$ through $D_{14}$, while the opposite terminals $P'_{11}$ through $P'_{14}$ of these positive word lines are connected to the positive plane switching circuit $101_1$. In the same manner one terminals $P_{21}$, $P_{22}$ ... of other positive word lines (not shown) are connected to said line switching circuits $100_1$ and $100_2$ through diodes $D_{21}$, $D_{22}$ ... and the other terminals $P'_{21}$, $P'_{22}$ ... to the positive plane switching circuit $101_2$. One terminal $P_{1d}$ of the positive dummy word line $64_1$ provided for the unit memory plane $61_1$ is connected to the positive dummy line switching circuit 192 through a diode $D_{1d}$ while the other terminal $P'_{1d}$ to said positive plane switching circuit $101_1$. One terminal $P_{2d}$ of the positive dummy word line $64_2$ is connected to the positive dummy line switching circuit 102 through a diode $P_{2d}$ while the other terminal $P'_{2d}$ to said positive plane switching circuit. Further, one terminal $N_{1d}$ of the negative dummy word line $65_1$ provided for the unit memory plane is connected to the negative dummy line switching circuit 108 through a diode $D_{1n}$ and the other terminal $N'_{1d}$ to the negative plane switching circuit $104_1$. Similarly one terminal $N_{2d}$ of the negative dummy word line $65_2$ is connected to said line switching circuit 108 through a diode $D_{2m}$ while the other terminal $N'_{2d}$ to the negative plane switching circuit $104_2$. One terminals $N_{11}$, $N_{21}$ ... of the negative word lines (not shown) provided for respective unit memory planes are connected to the negative line switching circuit $105_1$ through respective diodes $D_{15}$, $D_{25}$ ... and the other terminals $N'_{11}$, $N'_{21}$ ... respectively to negative plane switching circuits $104_1$, $104_2$. ... Further one terminals $N_{12}$, $N_{22}$ ... of the negative word lines, not shown, are connected to the negative line switching circuit $105_2$ respectively through diodes $D_{16}$, $D_{26}$ ..., and the other terminals $N'_{12}$, $N'_{22}$ ... to said plane switching circuits $104_1$, $104_2$ ....

These circuits are constructed as follows: For example, when it is desired to select the positive word lines provided for the unit memory plane $61_1$, input signals are supplied to the positive line switching circuit $100_2$ and the positive plane switching circuit 101 to select positive word lines having terminals $P_{12}$ and $P'_{12}$ for effecting ordinary two dimensional selection. Concurrently therewith input signals are applied to the negative dummy line switching circuit 103 and the negative plane switching circuit $104_1$ to also select negative dummy word lines having terminals $N_{1d}$ and $N'_{1d}$ to cause current to flow in said negative dummy word lines in the direction opposite to that flowing through said positive word line, as indicated by arrows A and B in FIG. 3. However, as these negative dummy word lines are not facing to the magnetic film memory elements $93_1$ and $93_2$, no output signal is generated therein. Only said selected positive word lines generate output signals.

With regard to the noise components, as has been described above, the noise component supplied from the positive line switching circuit $100_2$ is cancelled by that supplied from the negative dummy line switching circuit 103 and having opposite polarity. Similarly the noise component supplied from the positive plane switching circuit $101_1$ will be cancelled by that supplied from the negative plane switching circuit $104_1$ thus improving the signal to noise ratio.

As an alternative method of segregating positive word lines and negative word lines four unit memory planes $a_1$, $a_2$, $a_3$, $a_4$ and $b_1$, $b_2$, $b_3$, and $b_4$ may be stacked to form two columns as shown in FIG. 6 in which word lines provided for unit memory planes $a_1$ through $a_4$ comprise a positive word line group and those provided for unit memory planes $b_1$ through $b_4$ comprise a negative word line group. As shown in FIG. 7a alternate word lines of one memory element $a_1$ may be grouped into positive and negative word line groups. Alternatively, as shown in FIG. 7b alternate several word lines may be grouped into positive and negative word line groups. With these arrangements the positive and negative noise components will be more uniformly distributed, thus effectively decreasing the noise.

While in the illustrated embodiments the dummy word lines are arranged such that there will be no binary "1" and binary "0" outputs they may be constructed to always provide outputs of (—"0"). In such a case binary "0" output will be cancelled by the output generated in the dummy word line thus reducing the net signal to zero. Thus, only the output of binary "1" will appear With these arrangements the positive and negative noise which makes it very easy to discriminate the binary "0" from binary "1."

It is of course to be understood that this invention is also applicable to the fixed or semi-fixed type memory apparatus. As shown in FIGS. 8a and 8b two electroconductive magnetic wires $M_1$ and $M_2$ are juxtaposed and two output lines $O_1$ and $O_2$ are disposed to intersect with the magnetic wires $M_1$ and $M_2$ at substantially right angles. The fixed memory devices is completed by mounting permanent magnets $m_1$, $m_2$, $m_3$ and $m_4$ at respective cross points between said magnetic wires $M_1$ and $M_2$ and output lines $O_1$ and $O_2$.

When current is passed through magnetic wires $M_1$ or $M_2$ by utilizing them as the word lines outputs of the opposite polarities of binary "0" and binary "1" will be produced dependent upon the polarities or directions of N and S poles of the permanent magnets disposed at said cross points. If it is assumed now that the magnetic wire $M_2$ is utilized as the dummy word line, that all permanent magnets disposed on said dummy word line $M_2$ have the same polarity and that the word line is arranged to inherently produce an output of binary "1," then the sum of the outputs would be ("1"+"1") upon occurrence of the outputs of binary "1" on the desired word lines whereas would be ("0"+"1") upon occurrence of binary "0." Thus, the binary "1" and binary "0" outputs from this semi-fixed memory apparatus will become such that, with respect to the drive current $d$, the positive pulse $p$ corresponds to binary "1" and the negative pulse $m$ to binary "0" and that these pulses have oppositive polarities and symmetrical waveforms as shown in FIG. 9. Thus, it is clear that the sum ("0"+"1") means no signal condition. In other words "1"=(—"0") which is the equivalent that a signal (—"0") is generated in the dummy word line. As a consequence the sum ("1"+"1") means that the output of binary "1" is doubled which makes quite easy to discriminate binary "0" from binary "1."

This invention is also applicable to semi-fixed memory devices of known construction. As shown in FIG. 8c, such a semi-fixed memory apparatus may be fabricated by providing a plurality of perforations 11 through a printed circuit board 10 in the form of a matrix and by bonding word drive lines 12 to the board 10 which surround respective perforations 11 and are connected in series. Output lines 13 in the form of round conductors are extended through perforations 11 and thin film memory elements 14 are disposed on the output lines 13 at portions facing to said word drive lines 12. At each bent portion 16 of the word drive line 12, there is provided a perforation 15 through the printed circuit board 10 corresponding to each perforation 11 to receive a short circuiting rod 17 which serves to short circuit the word drive line 12. Dummy word lines (not shown) are provided for word drive lines, in the same manner as in the foregoing embodiments, for the memory planes comprising a semi-fixed memory device.

FIG. 10 is a circuit diagram of another example of the world selection drive circuit connected to word lines of the stack shown in FIG. 4. In the example shown in FIG. 10, one terminals of four positive line switching circuits $100_1$, $100_2$, $100_3$ and $100_4$ and a terminal of a positive dummy line switching circuit 102 are commonly connected to one terminal $c$ of the secondary winding 106 of a pulse transformer 110. In the same manner terminals of the negative line switching circuits $105_1$, $105_2$, $105_3$ and $105_4$ and a terminal of a negative dummy line switching circuit 103 are commonly connected to the other terminal $d$ of said secondary winding 106. One end of the primary winding 109 of the pulse transformer 110 is grounded while the other end is connected to the word drive circuit 107 via a resistor 108, the opposite end of the word drive circuit 107 being connected to the positive pole of a DC source. Other arrangements are identical to those shown in FIG. 5 and designated by the same reference numerals.

The operation of the memory is as follows. For example if it is desired to select the positive word line $62_2$ shown in FIGS. 3 and 4, at first signals are applied to the positive line switch circuit $100_2$ and the positive plane switching circuit $101_1$ to cause these circuits conductive. At the same time input signals are also applied to the negative dummy line switching circuit 103 and the negative plane switching circuit $104_1$ to render them conductive whereby the negative dummy word line $65_1$ closest to said positive word line $62_2$ is also selected.

Thus a continuous feedback loop will be completed across two terminals $c$ and $d$ of the secondary winding of the pulse transformer 110 which can be traced from the terminal $c$ through the positive line switching circuit $100_2$, one terminal $P_{12}$ of the positive word line $62_2$, the other terminal $P'_{12}$ thereof, through the positive plane switching circuit $101_2$ and the negative plane switching circuit $104_1$ to one terminal $N'_{1d}$ of the negative dummy word line $65_1$ and thence from the other terminal $N_{1d}$ of the negative dummy word line $65_1$ to the other terminal $d$ of the secondary winding 106 of the pulse transformer 110 through the negative dummy line switching circuit 103.

Under these conditions when a drive current as shown in FIG. 11a is applied to the word drive circuit 107 to drive the pulse transformer 110 the driving current will be supplied through the pulse transformer 110 to flow in said feedback loop in the direction shown in the drawing. Since one of the word lines included in the feedback loop comprises the dummy word line $65_1$, this dummy word line $65_1$ would not produce any output and only output from the selected positive word line $62_2$ could be taken out from output lines $83_1$ through $83_5$ shown in FIG. 3.

With regard to the word noise components, by the action of the pulse transformer, transient voltages are caused to appear symmetrically on the positive and negative word line groups thus providing effective cancelling.

More particularly because the circuit connected to one terminal $c$ of the secondary winding 106 of the pulse transformer 110 and the circuit connected to the other terminal $d$ are perfectly symmetrical, when a drive current as shown in FIG. 11a is passed through the primary winding 109 of the pulse transformer 110, a transient voltage of a waveform shown in FIG. 11b will appear at the terminal $c$ of the secondary winding 106 of the pulse transformer 110 whereas a transient voltage of a waveform shown in FIG. 11c will appear at the other terminal $d$, said two transient voltages having the same waveform but of opposite polarity. Inasmuch as the noise components are caused by these transient voltages, noise voltages coupled to output lines $83_1$ through $83_5$ from positive and negative word line groups will also have the same waveform but of opposite polarity, thus cancelling each other or minimizing the effect of noise voltages.

As shown in FIG. 12 the positive and negative plane switching circuits can be commonly fabricated by means of a single transistor Tr and a single pulse transformer T, thus decreasing the number of circuit components required.

Further, in this embodiment circuits are driven by a single word drive circuit on the primary side of a pulse transformer so that it is able to make all words to have word current pulses of equal width thus decreasing the cycle time. Further, utilization of the pulse transformer makes it possible to step up or step down the current value between its primary and secondary windings which is very convenient from the standpoint of the circuit design.

Where a high speed operation is desired it is necessary to completely interrupt diodes that have not been selected. To this end a grounded neutral tap may be provided on the secondary of the pulse transformer and a resistor is provided for applying backward bias voltage to diodes connected to the secondary so as to normally maintain these diodes off-state.

Figure 13:
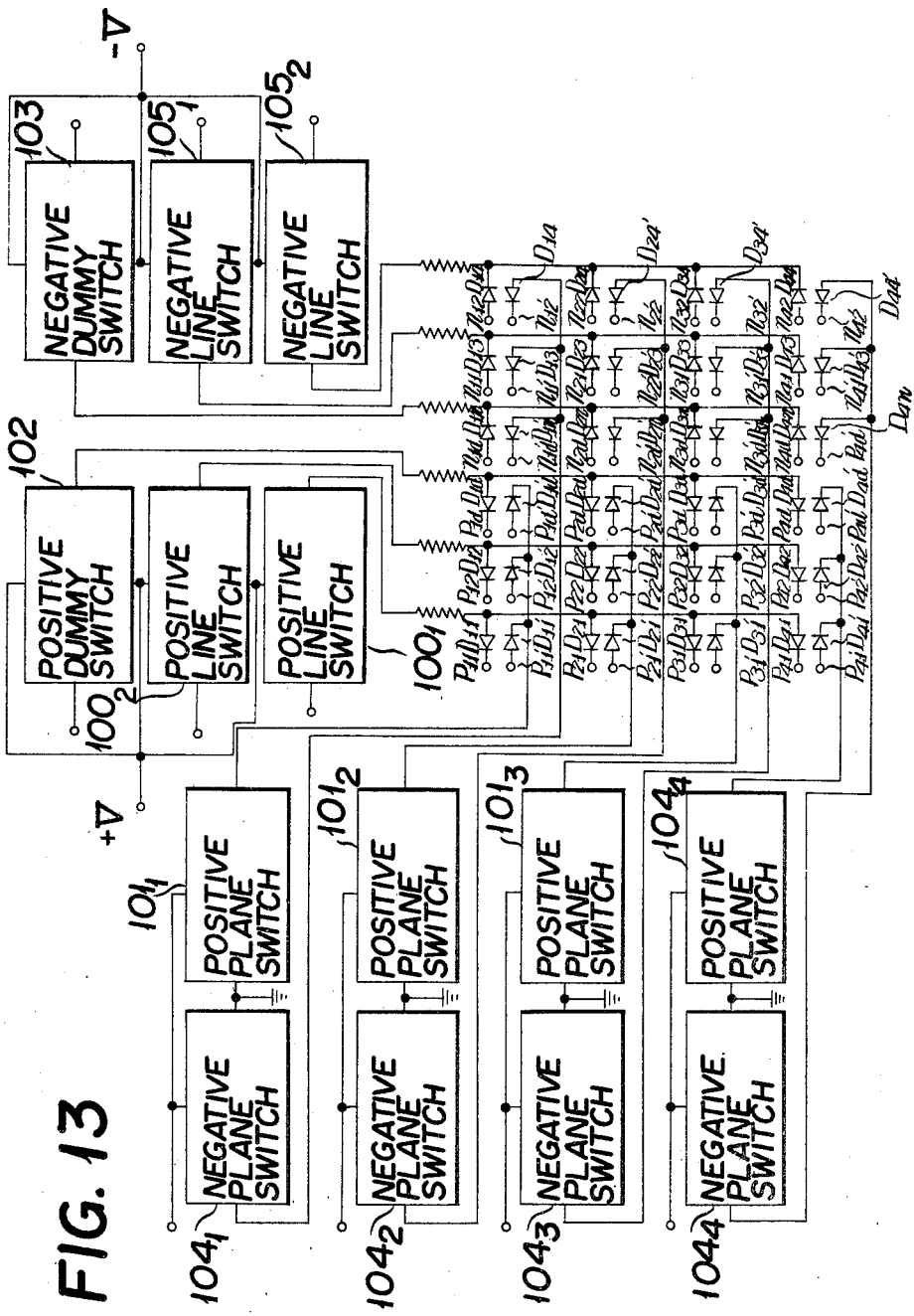
FIGS. 13, 14 and 16 are connection diagrams of other examples of the word selection drive circuit constructed in accordance with this invention.

FIG. 13 shows a circuit diagram illustrating still further modification of the word selecting drive circuit. Although in the above described embodiment one terminals $P_{11}$, $P_{12}$ ... of positive word lines $62_1$, $62_2$ ... are respectively connected to positive line switching circuits $100_1$, $100_2$ ... through diodes $D_{11}$, $D_{12}$ ... and their opposite ends $P'_{11}$, $P'_{12}$ ... are connected to the positive plane switching circuit $101_1$, in the circuit shown in FIG. 13, opposite terminals $P'_{11}$, $P'_{12}$ ... of the positive word lines $62_1$, $62_2$ ... are connected to the positive plane switching circuit 101 respectively through forward steering diodes $D'_{11}$, $D'_{12}$ ... One ends of said positive line switching circuits $100_1$, $100_2$ and of the positive dummy line switching circuit 102 are commonly connected to the positive pole of a DC source while one ends of the negative line switching circuits $105_1$ and $105_2$ and of the negative dummy line switching circuit 103 are commonly connected to the negative pole of the DC source.

In this embodiment steering diodes $D'_{11}$ and $D'_{12}$ are connected on both sides of the word line and suitable bias voltages are applied to said diodes so that all diodes other than those included in current carrying circuits are biassed reversely. Consequently, all word lines connected to the selected plane switching circuit other than those selected will be coupled to the current path through the coupling capacitance of the diode. Denoting the coupling capacitance of the diode by $Cd$ the electrostatic capacitance between the current path and D output lines will have a value corresponding to $Cd$ and $DCo$ per one word line. Since, generally $Cd \ll DCo$ (here $Co$ represents the electrostatic capacitance of one cross point between one word line and one output line) provision of diodes on both sides results in the reduction in the electrostatic capacitance which tends to shunt current.

Denoting the total electrostatic capacitance by $C'_T$, then we obtain $$C_T' = \frac{M}{2} \cdot \frac{DCo \cdot Cd}{Cd + DCo} \ll \frac{MD}{2} Co$$

where M represents the number of plane switching circuits.

Assuming now that $Co = 0.3$ pf., $M = 128$, $D = 64$ and $Cd = 2$ pf., the total number of words would be 16384. This number is divided into two groups which are respectively selected by 64 line switching circuits and 128 plane switching circuits. Then $C'_T = 116$ pf. which is about one half of the capacitance of the conventional arrangement, thus greatly decreasing the noise components.

It will thus be understood that according to this invention it is possible to decrease the value of current shunting electrostatic capacitance and to suppress the tendency of increasing noise components by including steering diodes on both sides of the word line.

Figure 14:
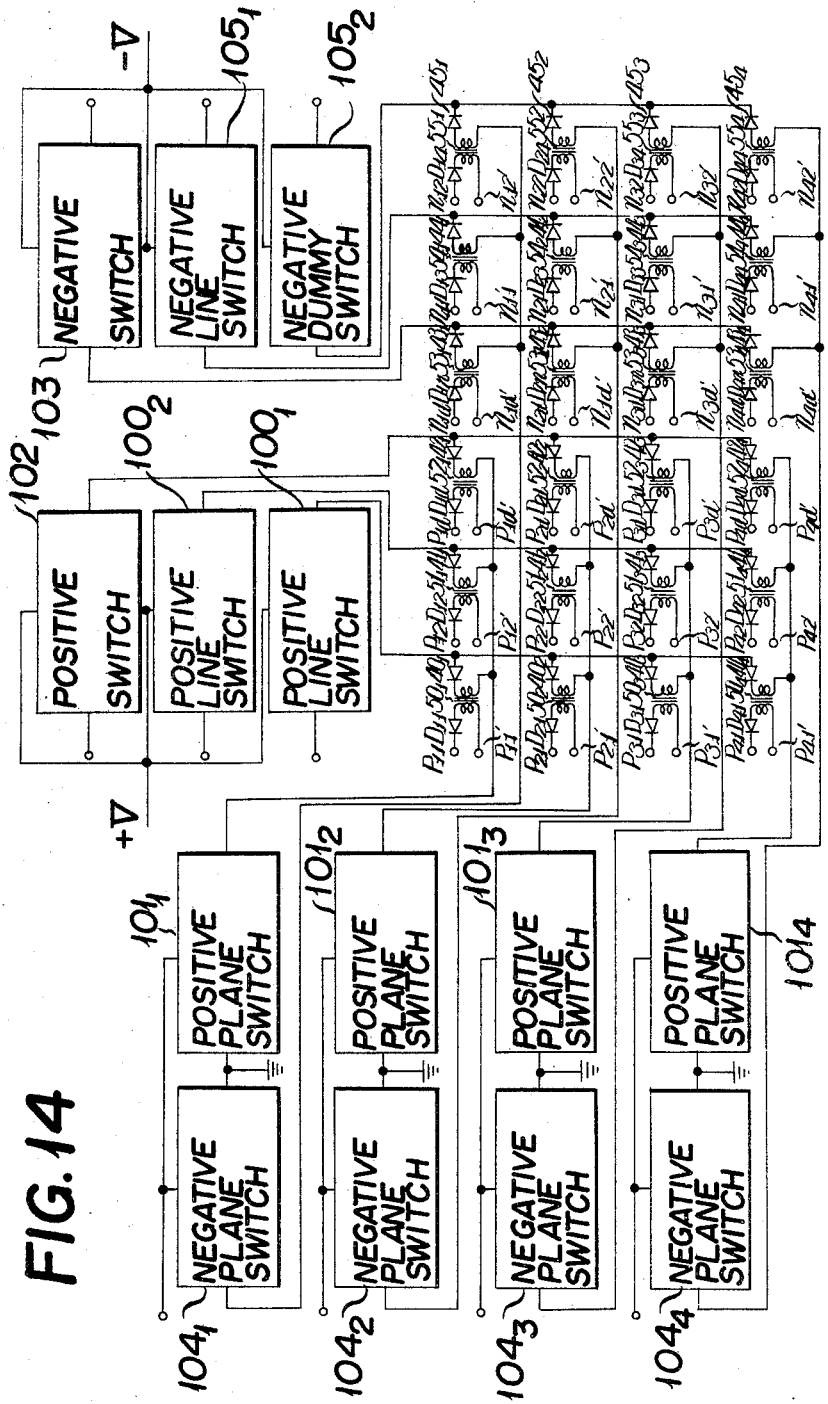

FIG. 14 shows a connection diagram to illustrate still another example of the word selection drive circuit embodying this invention.

In FIG. 14, one terminals $P_{11}$ and $P_{12}$ of two positive word lines, shown in FIG. 3 and comprising a unit memory plane are connected to one terminals of the primary windings of pulse transformers $50_1$ and $51_1$ respectively through diodes $D_{11}$ and $D_{12}$, one terminals of the secondary windings of said pulse transformers being respectively connected to positive line switching circuits $100_1$ and $100_2$ through diodes $40_1$ and $41_1$. The other terminals $P'_{11}$ and $P'_{12}$ of the positive word lines $62_1$ and $62_2$ are respectively connected to the other terminal of the primary windings of said pulse transformers $50_1$ and $51_1$, the other terminals of the secondary windings thereof being connected to the positive plane switching circuit $101_1$. Positive word lines of other unit memory planes which are laminated as shown in FIG. 4 are also connected similarly as shown in FIG. 14. One terminal $P_{1d}$ of the positive dummy word line $64_1$ provided for each unit memory plane is connected to one terminal of the primary winding of a pulse transformer $52_1$ through a diode $D_{1d}$, one terminal of the secondary winding of said pulse transformer being connected to the positive dummy line switching circuit 102. The other terminal $P'_{1d}$ of the positive dummy word line $64_1$ is connected to the other terminal of the primary winding of the pulse transformer $52_1$ and the other terminal of the secondary winding thereof is connected to said positive plane switching circuit $101_1$.

As shown in the drawing, other positive dummy word lines provided for other unit memory planes are connected in the same manner. Negative word lines and negative dummy word lines of respective unit memory planes are similarly connected.

The operation of the above described embodiment is as follows:

Thus it is now assumed that input signals are simultaneously applied to the positive line switching circuit $100_2$, the positive plane switching circuit $101_3$, the negative dummy line switching circuit 103 and the negative plane switching circuit $104_3$, then the positive word line $68_2$ of the unit memory plane $61_3$ of FIG. 4 will be selected to read out its content. However, concurrently therewith the negative dummy word line $64_3$ formed on said memory element is also selected to be driven. Binary informations formed in output lines $83_1$ through $83_5$ are produced by memory elements in the form of thin magnetic films or ferrite cores disposed at respective cross points between said positive word line $68_2$ and output lines $83_1$ through $83_5$ and the word noise components coupled from the positive word line group and those supplied to output lines from negative word lines connected through negative word line groups cancel each other.

In this embodiment pulse transformers are provided between opposite terminals of all word lines to isolate respective word lines so that capacitances between the current path and output lines are isolated by said pulse transformers. By this reason it is possible to make these capacitances extremely small thus decreasing the noise components.

Figure 15:
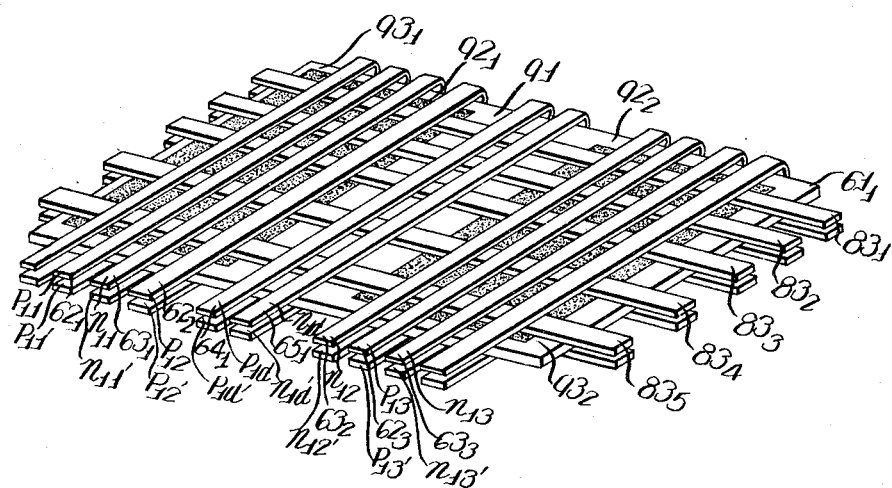
FIG. 15 is a perspective view of a portion of the memory plane shown in FIG. 16.

FIG. 15 is a perspective view of another unit memory plane embodying this invention which represents a practical construction of the diagram shown in FIG. 7a wherein the positive and negative word lines are disposed alternately. Thus, as shown in FIG. 15, positive word lines $62_1$, $62_2$ . . . and negative word lines $63_1$, $63_2$ . . . are alternately disposed on magnetic film memory elements $93_1$ and $93_2$ at substantially right angles with respect to output lines $83_1$ through $83_5$. Other elements are constructed identically to those shown in FIG. 3 and are designated by the same reference numerals. A plurality of, for example, four of such unit memory planes are laminated to form a stack as shown in FIG. 4.

Figure 16:
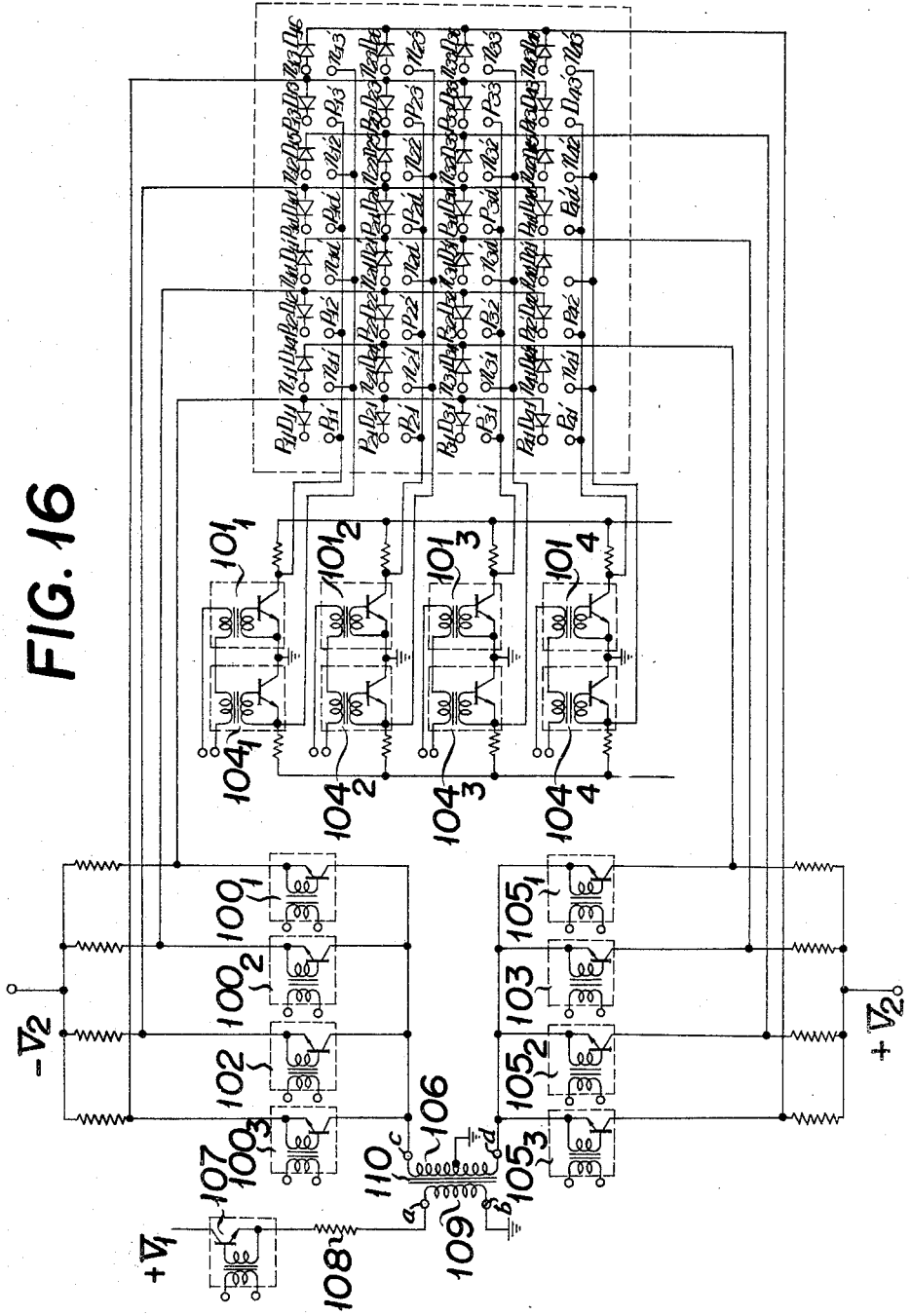

FIG. 16 is a connection diagram illustrating word selection drive circuits connected to various word lines of the stack constructed as above described. More particularly one terminals $P_{11}$ and $P_{12}$ of two positive word lines $62_1$ and $62_2$ provided for each unit memory plane are respectively connected to the positive line switching circuits $100_1$ and $100_2$ through respective diodes $D_{11}$ and $D_{12}$ while the other terminals $P'_{11}$ and $P'_{12}$ of said positive word lines are connected to the positive plane switching circuit $101_1$. Other positive word lines are similarly connected as shown in the drawing.

One terminal $N_{1d}$ of a negative dummy word line $65_1$ provided for the unit memory plane $61_1$ is connected to a negative dummy line switching circuit $103$ through a diode $D'_{11}$ while the other terminal $N'_{1d}$ to a negative plane switching circuit $104_1$. Other negative dummy word lines are connected in the same manner.

Said positive line switching circuits $100_1$, $100_2$ and $100_3$ and positive dummy line switching circuits $102$ are connected to one terminal $c$ of the secondary winding of a pulse transformer $110$ and to the negative pole of $-V_2$ volt of a DC source whereas said negative line switching circuits $105_1$ through $105_3$ and the negative dummy line switching circuit $103$ are connected to the other terminal $d$ of the secondary winding $106$ of the pulse transformer $110$ and to the positive terminal of $+V_2$ volt of the DC source. One terminal $b$ of the primary winding $109$ of the pulse transformer $110$ is grounded, the other terminal $a$ of the primary winding $109$ is connected to the word drive circuit $107$ through a resistor $108$ and the opposite end of the circuit $107$ is connected to the positive pole of $+V_1$ volt of a DC source.

In operation, when it is desired to select the positive word line $68_2$, input signals are supplied to the positive line switching circuit $100_2$ and the positive plane switching circuit $101_3$ to render them conductive. At the same time input signals are also applied to the negative dummy line switching circuit $103$ and the negative plane switching circuit $104_3$ to render them conductive thus concurrently selecting the negative dummy word line $65_3$ closest to said positive word line $68_2$.

Thus across opposite terminals $c$ and $d$ of the secondary winding $106$ of the pulse transformer $110$ there is connected a feedback loop which can be traced from the terminal $c$ through the positive line switching circuit $100_2$, one terminal $P_{32}$ of the positive word lines $68_2$, opposite terminal $P'_{32}$ thereof, the positive plane switching circuit $101_3$ and the negative plane switching circuit $104_3$ to one terminal $N'_{3d}$ of the negative dummy word line $65_3$ and then from the other terminal $N_{3d}$ of said negative dummy word line through diode $D'_{31}$, and the negative dummy line switching circuit $103$ to the other terminal $d$ of the secondary winding $106$ of said pulse transformer $110$.

Under these conditions when a drive current is supplied to the word drive circuit $107$ to drive the pulse transformer $110$ the pulse transformer will cause drive current to flow through said feedback loop in the direction indicated by the arrow. Because one of the word lines included in the feedback circuit comprises the dummy word line $65_3$, this dummy word line will not produce any output and only the output from the selected positive word line $68_2$ will be derived out of output lines $83_1$ through $83_5$.

Since transient voltages which cause noise are caused to appear symmetrically on both positive and negative word line groups by the action of the pulse transformer $110$ word noise components effectively cancel each other.

Further alternate arrangement of positive and negative word lines results in such directions of currents flowing through output lines that they cancel each other, whereby resultant noise component is greatly reduced.

Figure 17:
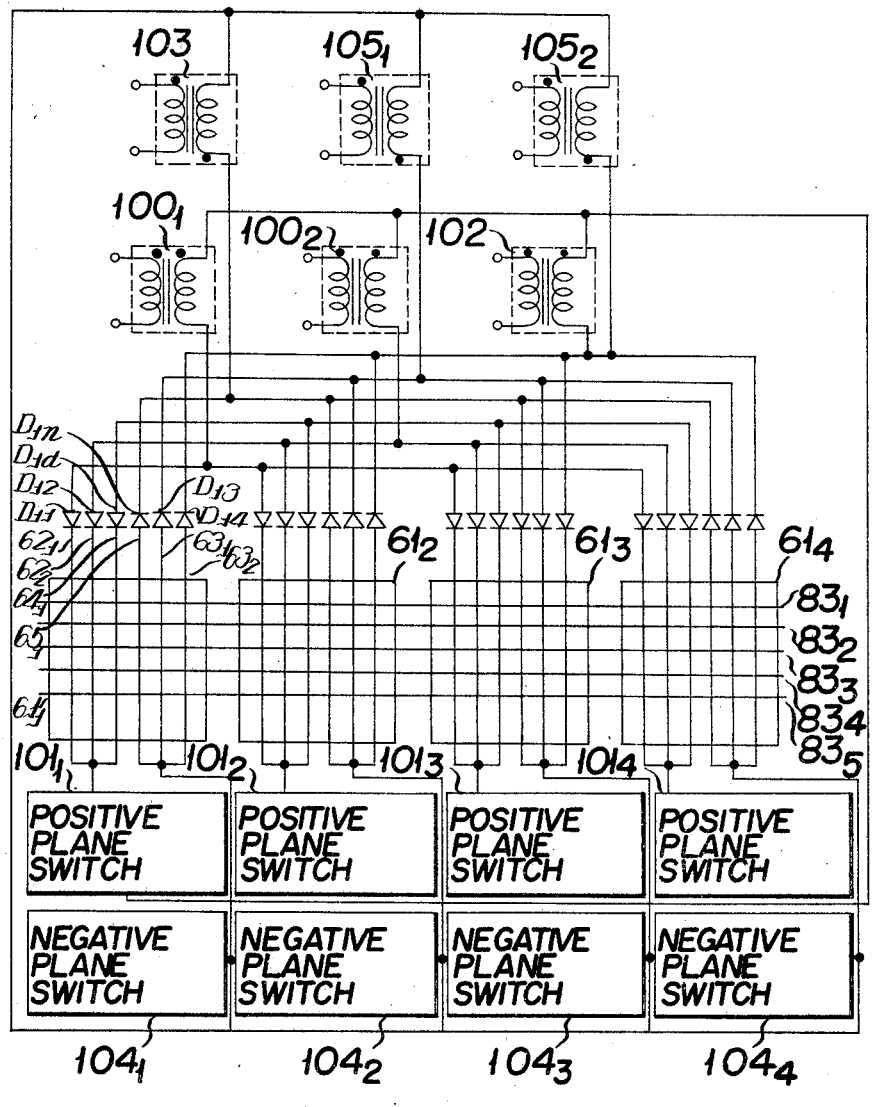
FIGS. 17 through 26 inclusive show still further examples of the word selection drive circuit embodying this invention.

FIG. 17 shows a connection diagram of another embodiment of this invention. In this embodiment positive and negative line switching circuits $100_1$, $100_2$ and $105_1$, $105_2$ and positive and negative dummy line switching circuits $102$ and $103$ are comprised by pulse transformers. More particularly one ends of positive word lines $62_1$, $62_2$ . . . and negative word lines $63_1$, $63_2$ . . . provided for the unit memory planes $61_1$ through $61_4$ respectively are commonly connected through diodes $D_{11}$, $D_{12}$ . . . to one terminal of the secondary winding of a pulse transformer which comprises positive line switching circuits $100_1$ and $100_2$ while the opposite ends are grouped as a positive word line group and a negative word line group for each unit memory plane and these positive and negative word line groups are respectively connected to the positive plane switching circuits $101_1$ through $101_4$ and negative plane switching circuits $104_1$ through $104_4$. Similarly one ends of positive dummy word lines $64_1$ through $64_2$ and of the negative dummy word lines $65_1$ through $65_4$ are commonly connected to one terminal of the secondary winding of a pulse transformer that comprises positive and negative dummy line switching circuits $102$ and $103$. The other ends of the positive and negative word lines are respectively connected to positive plane switching circuits $101_1$ through $101_4$ and negative plane switching circuits $104_1$ through $104_4$.

The opposite ends of said positive plane switching circuits $101_1$ through $101_4$ are commonly connected to the other terminal of the secondary winding of a pulse transformer that comprises said positive line switching circuits $100_1$ and $100_2$ and positive dummy line switching circuit $102$. The other ends of said negative plane switching circuits $104_1$ through $104_4$ are commonly connected to the opposite terminal of the secondary winding of a pulse transformer that comprises said negative line switching circuits $105_1$ and $105_2$ and the negative dummy line switching circuit $103$.

The polarity of the pulse transformer that comprises the positive line switching circuits $100_1$ and $100_2$ and the positive dummy line switching circuit $102$ is opposite to that of the pulse transformer that comprises the negative line switching circuits $105_1$ and $105_2$ and the negative dummy line switching circuit $103$. Consequently, like various embodiments described hereinabove, noise voltages effectively cancel each other. Thus, it is possible to derive from output lines information outputs of decreased noise component and hence of excellent signal to noise ratio. It is to be understood that word lines are divided into a positive word line group and a negative word line group which are arranged to be driven by signals of opposite polarities so that the polarity of the output is reversed. This can be achieved by constructing output circuits so as to have the same polarity.

Figure 18:
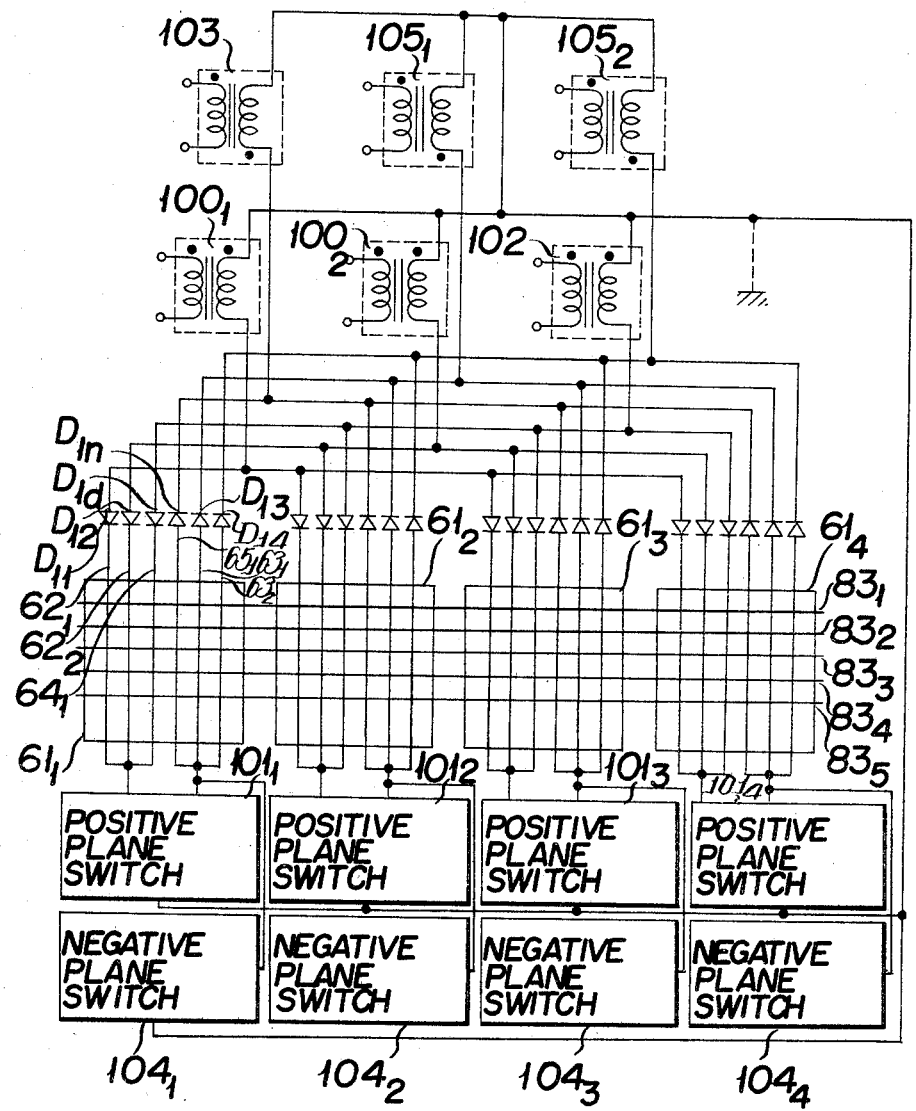

FIG. 18 shows a still further embodiment of the word selection type memory device of this invention. In this invention the common junction between the positive line switching circuits $100_1$, $100_2$, the positive dummy line switching circuit 102 and the positive plane switching circuits $105_1$, $105_2$ are connected to the common junction between the negative line switching circuits $105_1$, $105_2$, the negative dummy switching circuit 103 and the negative plane switching cricuits $104_1$ through $104_4$. This arrangement provides the same reference potential to various noises created on the positive and negative word line groups, thus further improving the effect of mutual cancellation of these noises on output lines. Of course, it is possible to ground said common junctions as shown by dotted lines, Other portions identical to those shown in the previous embodiment are designated by the same reference characters and it is believed unnecessary to explain them again.

Figure 19:
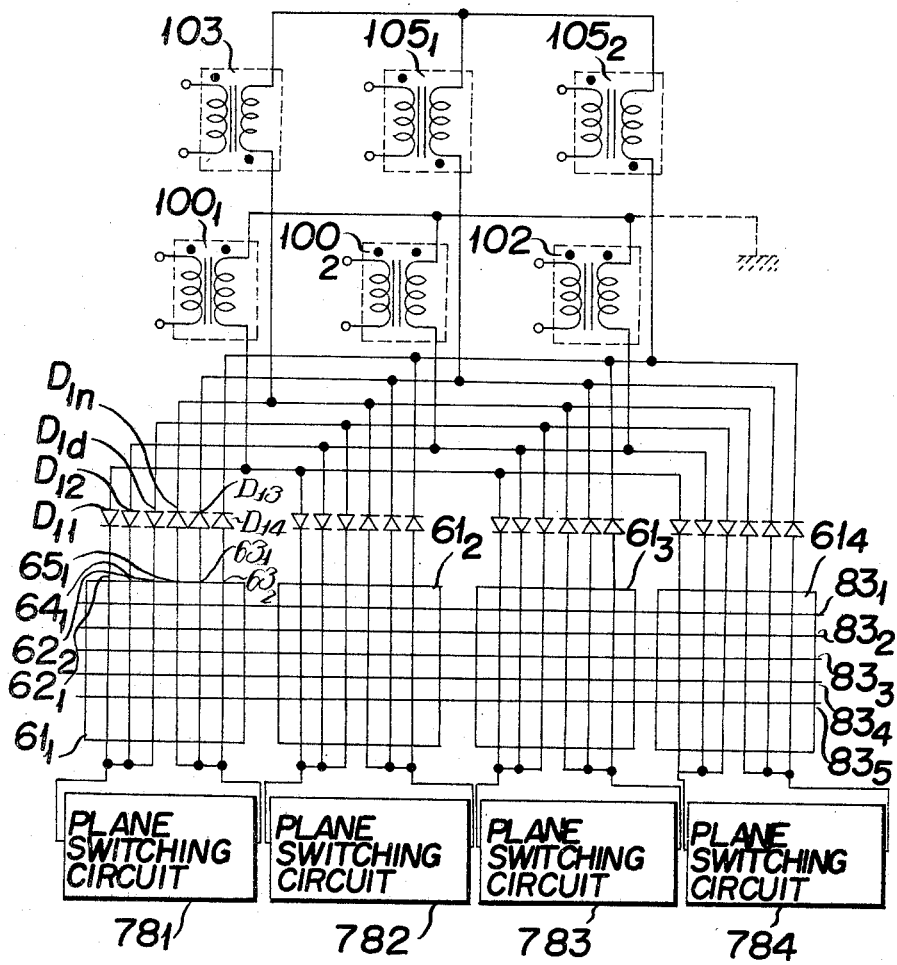

FIG. 19 shows a connection diagram of still another embodiment of the word selection type memory device embodying this invention. In this embodiment positive word line groups $62_1$, $62_2$ and the positive dummy word line $64_1$ of said unit memory plane $61_1$ are connected to the secondary winding of a pulse transformer that comprises the positive line switching circuits $100_1$, $100_2$ and 102, respectively through diodes $D_{11}$, $D_{12}$ and $D_{1d}$. The negative word line groups $63_1$, $63_2$ and the negative dummy word line $65_1$ of the same unit memory plane are connected to the secondary winding of a pulse transformer that comprises the negative line switching circuits 103, $105_1$ and $105_2$ respectively through diodes $D_{13}$, $D_{14}$ and $D_{1n}$. In the same manner positive and negative word line groups as well as positive and negative dummy word lines of another unit memory planes $61_2$, $61_3$ and $61_4$ are commonly connected to the secondary side of each of said pulse transformers respectively through diodes. Further, other ends of the secondaries of respective pulse transformers are connected together. This common junction may be grounded as shown by dotted lines. In each unit memory plane, the opposite ends of each of the positive word line group and the negative word line group may be connected together and plane switching circuits 781, 782, 783, 784 are respectively connected across corresponding pairs of common junctions, it being understood that each of said plane switching circuits may be identical to those employed in the previous embodiments.

In operation, the plane switching circuit 781, for example, is selected to select the word line groups of the unit memory plane $61_1$ to select and derive the negative line switching circuit $105_1$ whereby to select the desired normal negative word line $63_1$ out of said word line groups. At the same time the positive dummy line switching circuit 102 is selected and driven so as to select the positive dummy word line $64_1$ belonging to the word line groups on the opposite side contained in the same unit memory plane $61_1$ as said selected normal negative word line $63_1$ and driven by a signal of the opposite polarity. Thus, owing to the simultaneous selection of the dummy word line 723, output lines 731, 732 . . . provide information outputs of greatly reduced noise components and hence having improved signal to noise ratio in the same manner as in the foregoing embodiments.

More particularly, the current flowing through a positive or a negative normal word line selected in each unit memory plane are quite the same as the current flowing through the positive or negative dummy word line and noise components produced by these currents have the same magnitude but of opposite polarity, thus greatly improving the signal to noise ratio. Moreover, the number of plane switching circuits required for each unit memory plane may be only one thus greatly simplifying the construction. Other arrangements are identical to those shown in FIG. 18.

Figure 20:
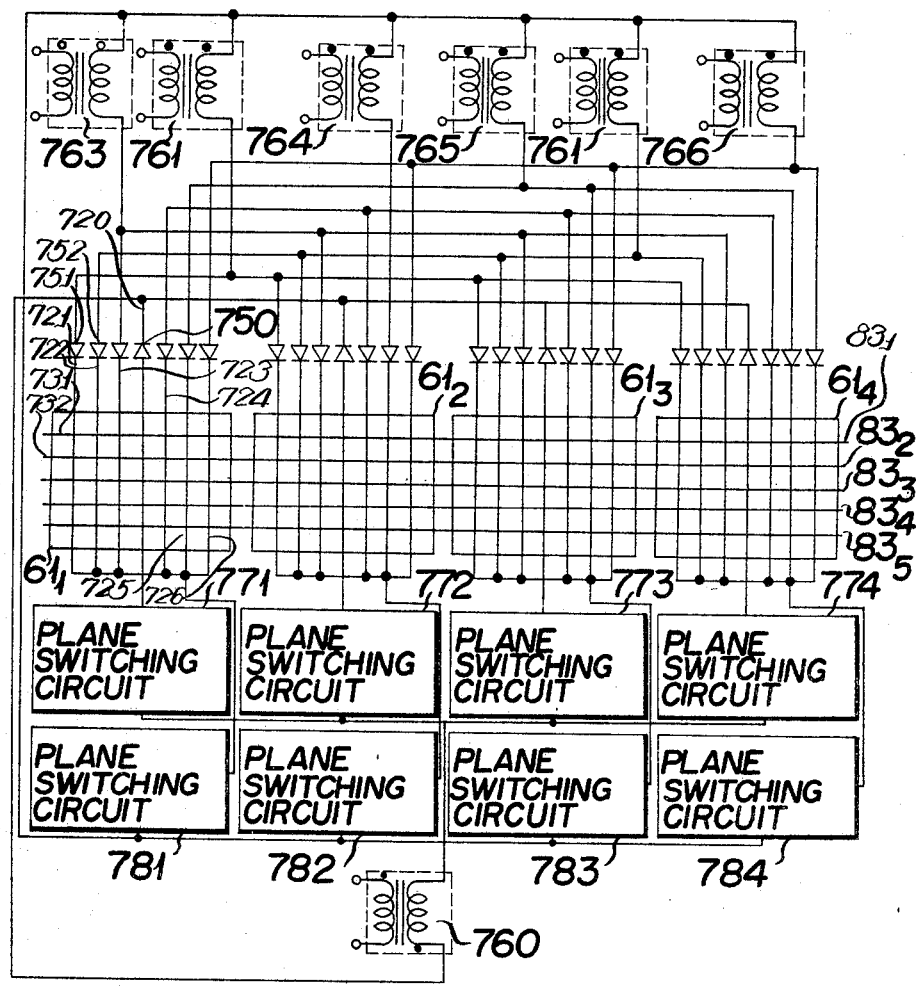

FIG. 20 shows another embodiment of the word selection type memory device of this invention. In this embodiment a common dummy word line is provided for all normal word lines in each unit memory plane. For example, a single dummy word line 720 is provided for all normal word lines 721, 722 . . . 726 provided for the unit memory plane $61_1$. One ends of the normal word lines 721 through 726 are commonly connected to one terminal of a plane switching circuit 781 whereas the opposite ends are connected respectively to one terminal of the secondary windings of six pulse transformers 761 through 766 that comprise line switching circuits respectively through diodes 751 through 756 poled as shown. The opposite terminals of said transformers are connected to the opposite end of the plane switching circuit 781. One end of the dummy line 720 is connected to one terminal of the secondary winding of a pulse transformer 760 that comprises the dummy word line switching circuit through a diode 750 of the opposite polarity as that of said diodes 751 through 756 while the other end to the opposite terminal of the secondary winding of said pulse transformer 760 through the dummy switching circuit 771. Another unit memory planes $61_2$ through $61_4$ are constructed similarly.

The word selection type memory device of this embodiment operates as follows: For example, the plane switching circuit 781 is selected to select normal word lines 721, 722 . . . on the unit memory plane $61_1$ to select and drive the pulse transformer 765 whereby the desired word line 722 is selected out of said normal word lines 721, 722 . . . . Concurrently therewith the plane switching circuit 771 and the pulse transformer 760 are also selected and driven to select the dummy word line 720 which is provided on the same unit memory plane $61_1$ as said selected normal word line 722 whereby to drive the dummy work line 720 with a signal having a polarity opposite to that of said normal word line. Selection of the dummy word line causes output lines $83_1$ through $83_5$ to provide output informations containing greatly reduced noise component and hence having improved signal to noise ratio. It is particularly noted that each pair of normal word line and dummy word line which are connected to selected and driven pulse transformers 760 and 765 and are in half-selected state exists for each unit memory plane. As a consequence transient voltages formed on word lines in half-selected state will have opposite polarities so that they will cancel each other when coupled to output lines through the electrostatic capacitance existing at cross points between the word lines and output lines. Thus it is possible to derive out information outputs containing greatly reduced noise component and hence of improved signal to noise ratio. Further there is an advantage that the construction is very simple because each unit memory plane requires to be provided with only one dummy word line.

Figure 21:
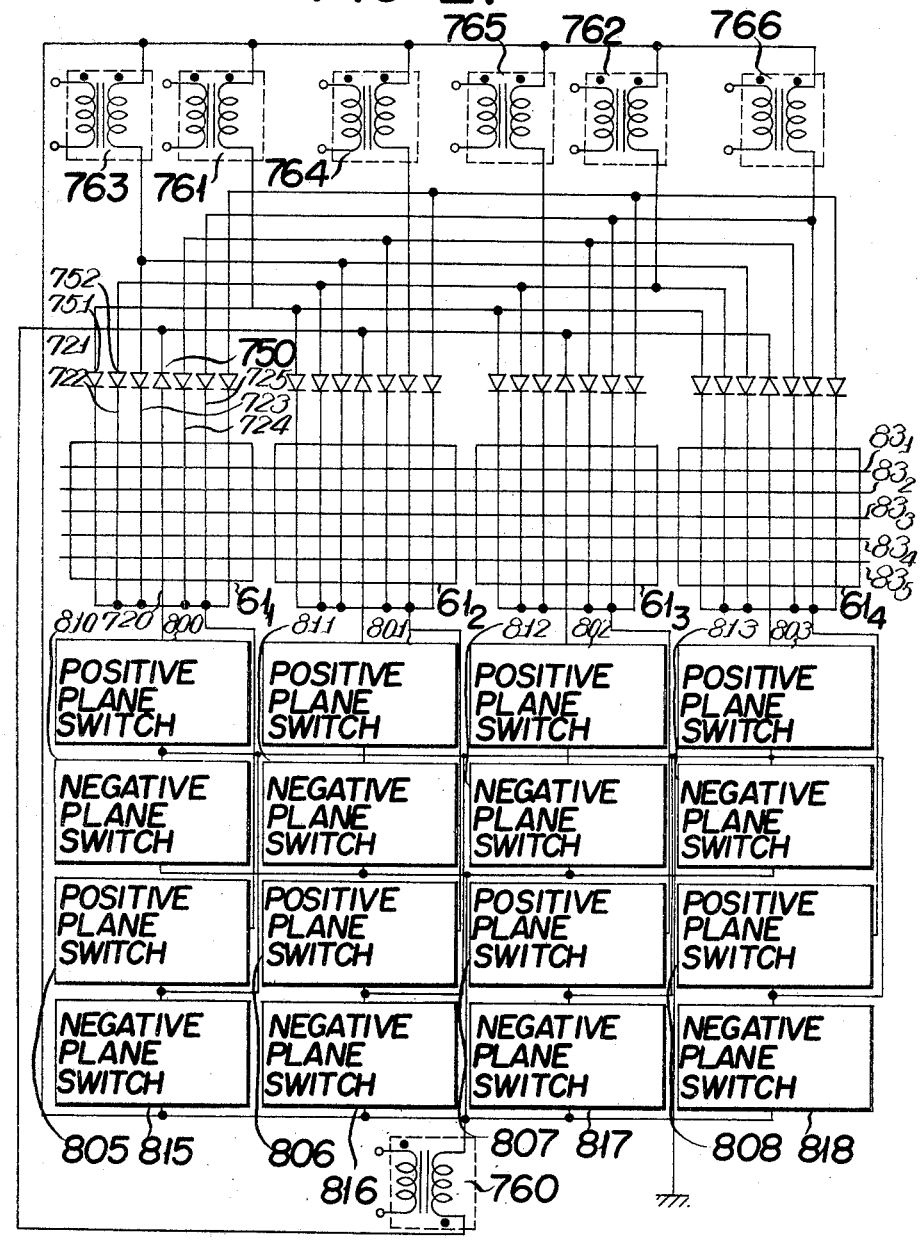
Figure 22:
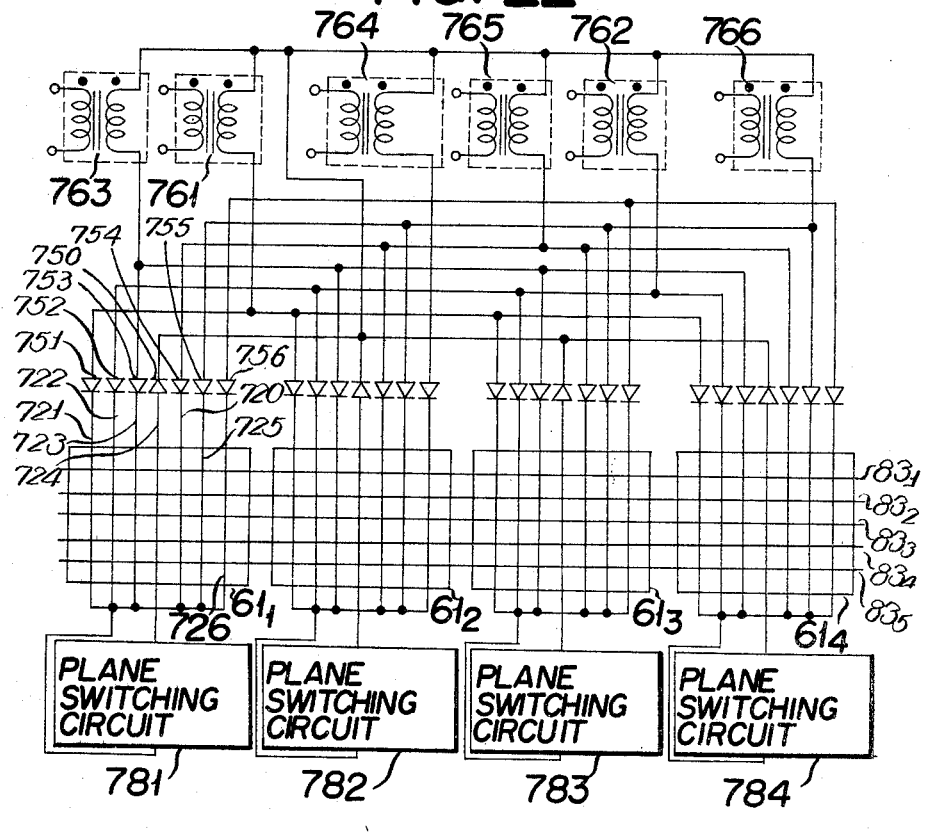

Still another embodiment of the novel word selection type memory device is shown in FIG. 21. More particularly, in this embodiment respective plane switching circuits 771 through 774 and 781 through 784 are comprised by series combination of respective positive plane switching circuits 800, 801, 802 . . . and negative plane switching circuits 810, 811, 812 . . . and the junctions between positive and negative plane switching circuits are grounded. With this construction the word line in half-selected state and connected to the selected and driven plane switching circuit will be maintained substantially at the ground potential to further decrease the noise formed on output lines. Other portions identical to those shown in the foregoing embodiments are designated by the same reference numerals.

FIGS. 22 to 26 inclusive show further different modifications of word selection type memory device embodying this invention. In the modification shown in FIG. 22 a common dummy word line is provided for all normal word lines in each unit memory plane thus eliminating the pulse transformer employed in FIG. 21 for constituting the dummy word line switching circuit. Thus, for example, a single dummy word line 720 is provided for all normal word lines 721 through 726 on the unit memory plane 61₁, one ends of the normal word lines 721 through 726 being commonly connected to one end of a plane switching circuit 781 while the other ends to common junctions of secondary windings of pulse transformers 761 through 766 via a diode 750 poled as shown in the drawing. Other ends of the secondary windings of pulse transformers 761 through 766 are respectively connected to the other ends of said normal word lines 721 through 726 through diodes 751 through 756 having polarities as shown in the drawing. Other unit memory planes 61₂ through 61₄ are constructed similarly.

Figure 23:
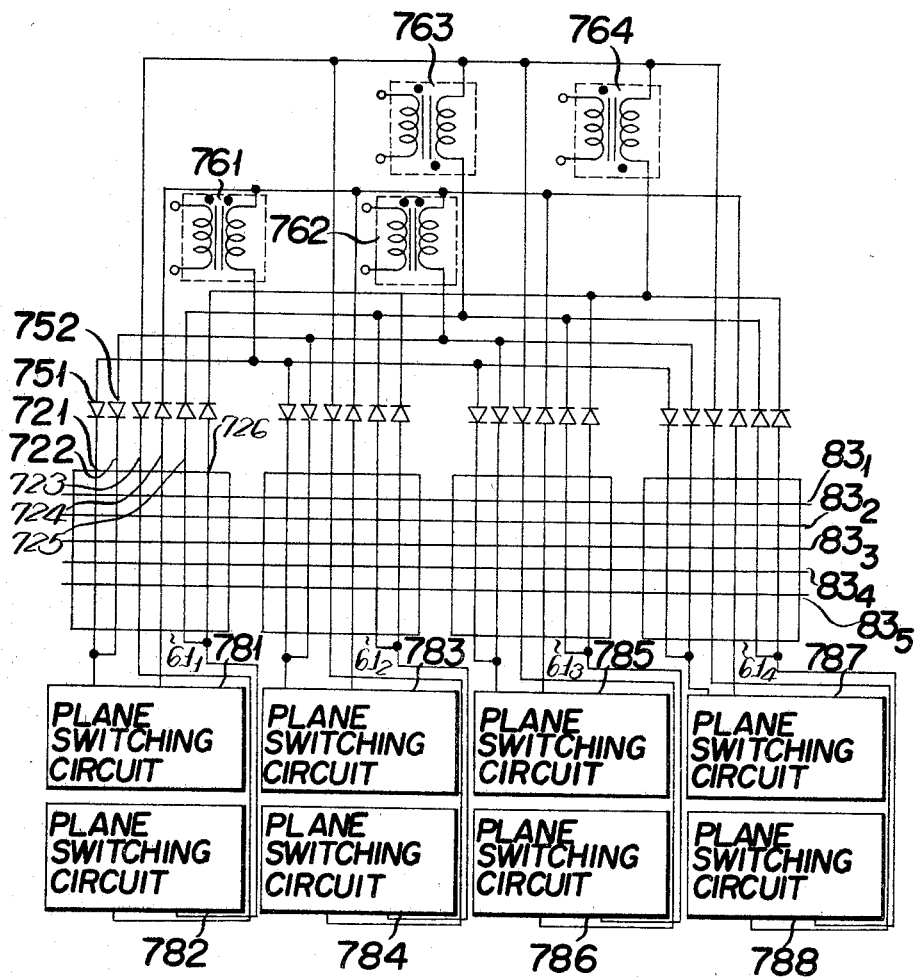

In the modification shown in FIG. 23, in each of unit memory planes normal word lines are divided into positive normal word groups 721, 722 and negative word line groups 725, 726 and a positive dummy word line 723 and a negative dummy word line 724 are provided in parallel with said word line groups. The positive word line groups 721, 722 are connected to the secondary windings of the first pulse transformers 761 and 762 respectively through diodes 751 and 752, and the other terminals of these secondary windings are commonly connected to the negative dummy word line 24 through a diode 754. Further, the opposite ends of the positive word groups 721 and 722 are connected to the opposite end of the negative dummy word line 724 through the first plane switching circuits 781, 783 . . . . Also said negative word line groups 725 and 726 are connected to one terminals of the secondary windings of the second pulse transformers 763 and 764 respectively through diodes 755 and 756, whereas the other terminals of these secondary windings are commonly connected to the positive dummy word line 723 through a diode 753. The other ends of the negative word line groups 725 and 726 are also connected to the other ends of the positive dummy word line 723 through the second plane switching circuits 782, 784 . . . . This construction results in a reduction in the number of normal word lines connected to the selected plane switching circuit and are maintained in the half-selected state and in the corresponding decrease in the noise supplied to the output lines from word lines in the half-selected state. Other portions identical to those shown in the previous examples are designated by the same reference numerals.

Figure 24:
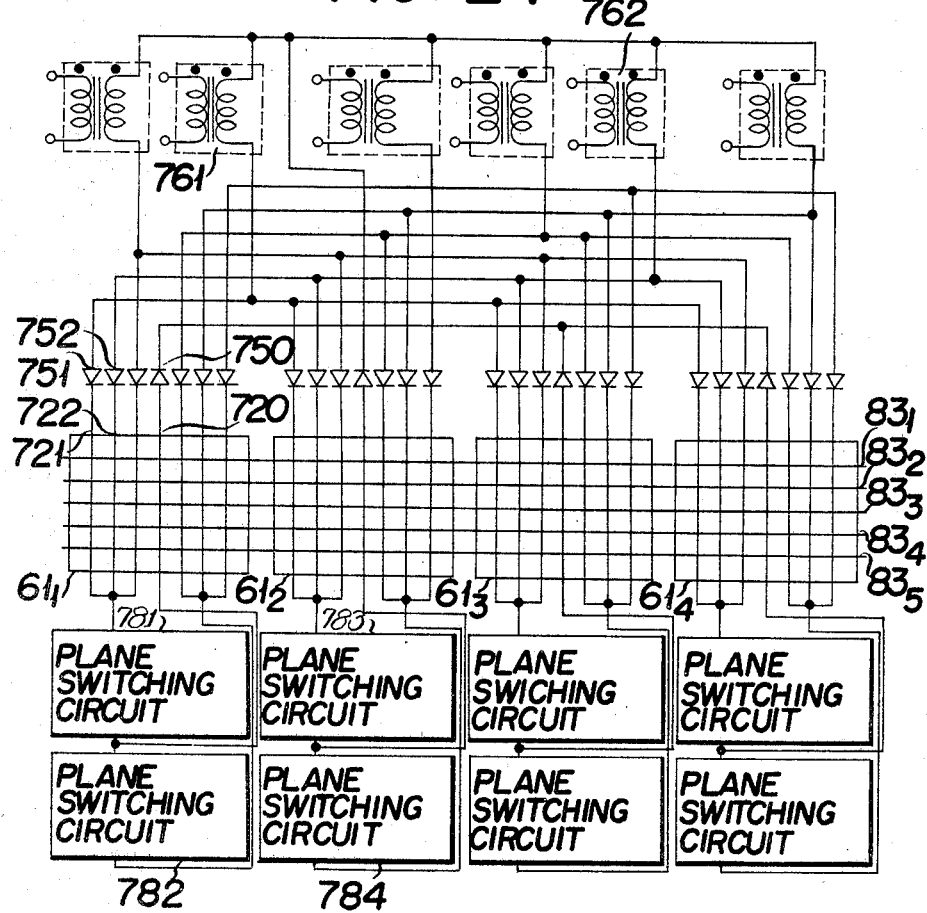

The embodiment shown in FIG. 24 corresponds to the modification of FIG. 23 wherein positive and negative dummy lines provided for the positive and negative word line groups 721, 722 . . . in FIG. 23 are ocmbined into a single dummy line 720. This construction reduces (viz. one) between the number of positive word line groups and negative word line groups which are connected to selected plane switching circuits and are maintained in half-selected state, whereby the magnitude of the noise which is supplied to the output lines from these word lines in half-selected state is further decreased. Other portions are designated by the same reference numerals as in the foregoing embodiments.

Figure 25:
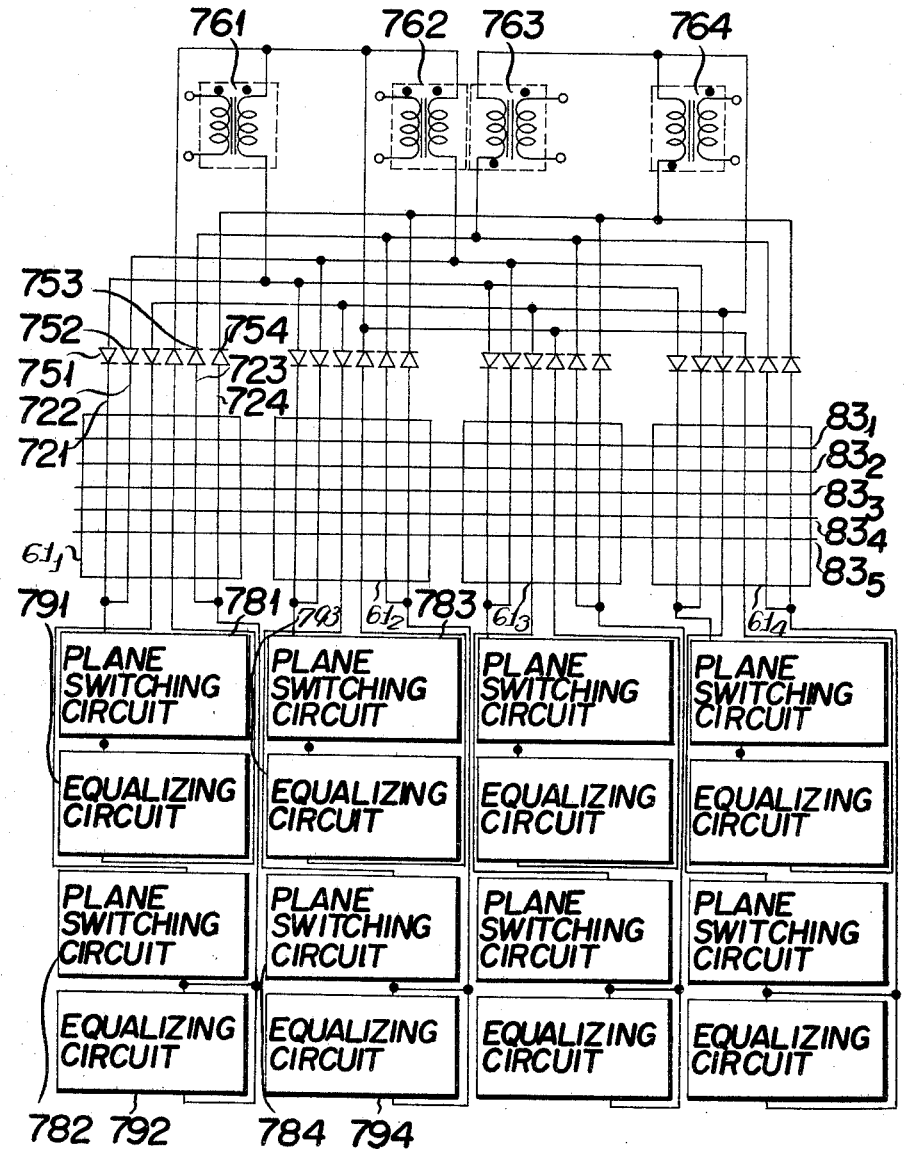

In the arrangement shown in FIG. 25, a plurality of normal word lines 721, 722 . . . are juxtaposed and are grouped into positive word line groups 721 and 722 and negative word line groups 723 and 724. A negative dummy word line 800 is arranged in parallel with the positive word line groups 721 and 722 while a positive word line 801 is arranged in parallel with negative word line groups 723 and 724. The positive word line groups 721 and 722 of the unit memory plane 61₁ are connected to one terminal of the secondary windings of the first pulse transformers 761 and 762 respectively through diodes 751 and 752. The opposite terminals of these secondary windings are commonly connected to the negative dummy line 800 through a diode 810. Whereas negative word line groups 723 and 724 are connected to one terminals of the secondary windings of the second pulse transformers 763 and 764 respectively through diodes 753 and 754. The other terminals of the secondary windings of these pulse transformers 763 and 764 are connected to said positive dummy word line 801. In the similar manner, positive and negative word lines provided for other unit memory planes 742, 743 and 744 are connected to one terminals of the secondary windings of said first and second pulse transformers 761 through 764. The other terminals of the secondary windings of the first pulse transformers 761 and 762 are commonly connected to the negative dummy word line through diodes, while the other terminals of the secondary windings of the second pulse transformers 763 and 764 are commonly connected to the positive dummy word line through diodes. Other ends of said positive word line groups 721 and 722 of each memory plane are connected to the other end of said negative dummy word line 800 through the first plane switching circuits 781, 783 and equalizing circuits 791, 793 . . . , which are connected in series. Similarly the opposite ends of said negative word line groups 723 and 724 are connected to the other end of said positive dummy word line 801 through serially connected plane switching circuits 782, 784 . . . and equalizing circuits 792, 794 . . . , the junctions between said plane switching circuits 781, 782 . . . , and between equalizing circuits 791, 792 . . . being grounded. Equalizing circuits 791, 792 and plane switching circuits 781, 782 . . . which are connected in series may have equal impedance. Thus, the equalizing circuit may have the same construction as the plane switching circuit.

In operation, transient voltages are induced in the normal word line 724 at cross points between it and respective output lines 731, 732 . . . . These transient voltages are supplied to output lines as noises through the electrostatic capacitance existing at said cross points. However the dummy word line 801 has the same impedance as the normal word line with reference to the grounded junction because it is connected in series with the plane switching circuits 781 and 782 through the equalizing circuits 791 and 792 having equal impedances and the junction therebetween are grounded. As a consequence the noise supplied to the output lines through selected normal word line 724 and the noise supplied to the output lines from selected dummy word line 801 will have the same magnitude but opposite polarity thus cancelling each other. Since the word lines in the half-selected state and connected to the plane switching circuit 782 which has been selected and now in conductive state will produce greatly reduced noise because they are grounded through the plane switching circuit 782 and equalizing circuit 792 which are conductive. Further half-selected word lines connected to said selected pulse transformer 764 comprises a pair of normal word line and a dummy word line for each unit memory plane which conduct current in the opposite direction and have equal impedance with respect to the grounded point. Consequently noises supplied from these half-selected word lines to output lines cancel each other to greatly decrease the resultant noise thus improving the signal to noise ratio.

Figure 26:
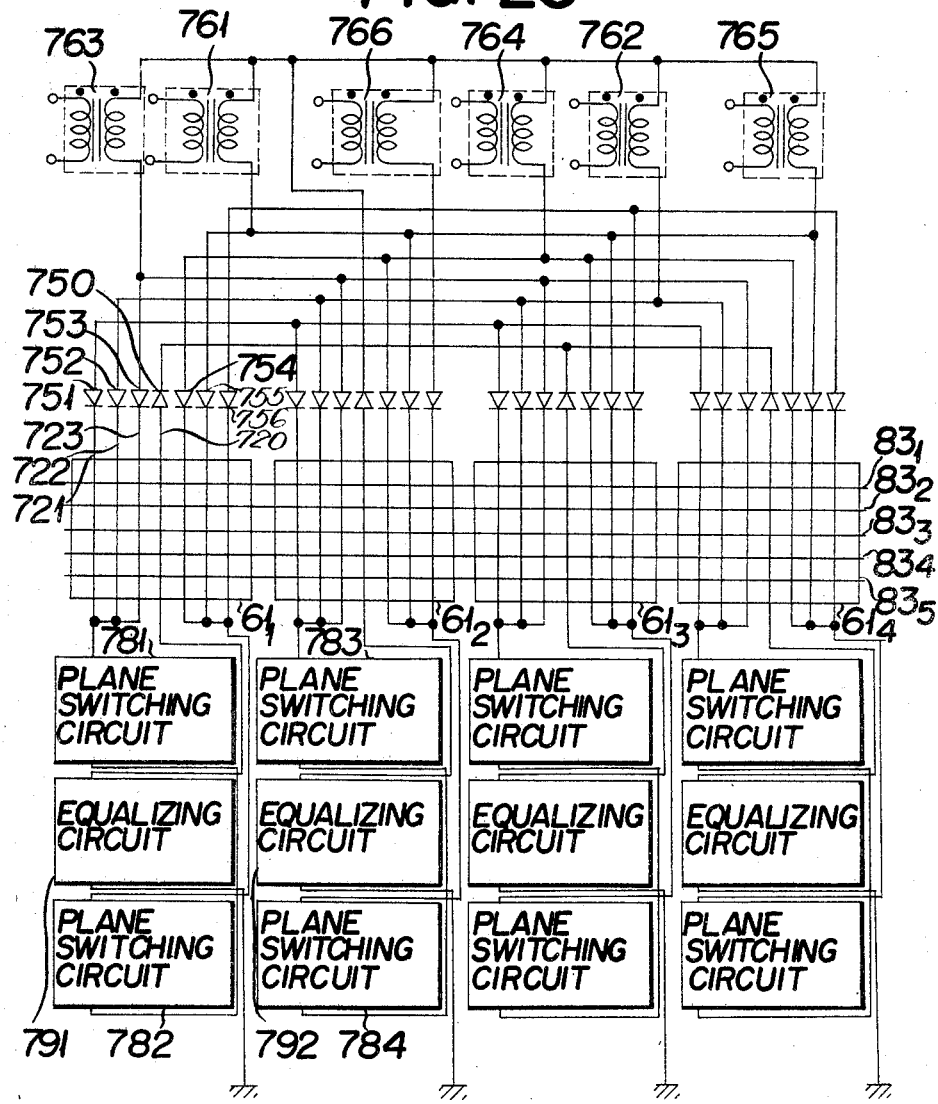

In the embodiment shown in FIG. 26, a single dummy word line 800 is provided for positive word line groups 721, 722 and 723 and negative word line groups 724, 725, 726. This dummy word line 800 is commonly connected to the first and the second plane switching circuits 781, 782 . . . through equalizing circuits 791, 792 . . . , and the common junction is grounded. Further the common junction between secondary windings of the first pulse transformers 761, 762 and 763 is connected to the common junction between secondary windings of the second pulse transformers.

From the foregoing various embodiments it will be obvious that this invention provides a new and improved word selection type memory device wherein noises are greatly reduced so that the signal to noise ratio is remarkably improved.

In view of the above, it will be evident that many modifications and variations are possible in the light of the above teachings. It therefore is to be understood that within the scope of the appended claims the invention may be practiced otherwise than as specifically described.

What is claimed is:

1. A word selection type memory device including at least one memory plane comprising a plurality of juxtaposed normal word lines and at least one dummy word line, a plurality of juxtaposed output lines arranged at substantially right angles with respect to said normal word lines and said dummy word line, and memory elements disposed at respective cross points between said normal word lines and said output lines, said output lines being arranged on said memory plane and being connected in series for each bit, said normal word lines and said dummy word line being connected to word selecting drive means, said word selecting drive means operating to select and drive one of said normal word lines while at the same time to select and drive, with a polarity opposite to said driven normal word lines, said dummy word line included in the memory plane containing said selected and driven normal word line, and said normal word lines and said dummy word line being arranged such that noise voltages induced in respective output lines from said selected and driven normal word line, dummy word line, and word lines of other memory planes which are connected to drivers which select and drive said normal word line and dummy word line and maintained in the half-selected state will have opposite polarities and substantially the same waveform whereby to decrease the net noise voltage induced in said output lines.

2. The memory device according to claim 1 wherein said plurality of normal word lines included in said memory plane are divided into a first word line group and a second word line group, a first and second dummy word lines are respectively arranged in parallel with said first and second normal word line groups, said word selecting driving means is arranged such that when selecting one word line out of said first normal word line group, it functions to concurrently select and drive said second word dummy line so as to pass therethrough currents of opposite polarities and of substantially the same magnitude whereas, when selecting one word line out of said second normal word line group, functions to concurrently select and drive said first dummy word line whereby to pass therethrough currents of opposite polarities and substantially the same magnitude.

3. The memory device according to claim 2 wherein said word selecting drive means includes a first line switching circuit and a first diode serially connected between the positive pole of a source of supply and one end of said first normal word line, a first plane switching circuit connected between the other ends of said first normal word lines and the ground, a first dummy line switching circuit and a second diode serially connected between the positive pole of said source and one end of said first dummy word line, the other end of said first dummy line being connected to said first plane switching circuits, a second line switching circuit and a third diode serially connected between the negative pole of said source and one end of said second normal word line, a second plane switching circuit connected between the other end of said second normal word line and the ground, a second dummy line switching circuit and a fourth diode serially connected between the negative pole of said source and one end of said second dummy word line, the opposite end of said second dummy word line being connected to said second plane switching circuit, and means to concurrently select and drive either one of said first and second line switching circuits, a plane switching circuit and a dummy line switching circuit corresponding to said selected line switching circuit and a plane switching circuit corresponding to said plane and dummy line switching circuit whereby to select either one of said first and second normal word lines and a dummy word line corresponding to said selected normal word line.

4. The memory device according to claim 2 wherein said word lines belonging to said first and second word line groups are alternately arranged on the same memory plane.

5. The memory device according to claim 2 wherein a plurality of groups of said first and second normal word lines are alternately arranged on the same memory plane.

6. The memory device according to claim 2 wherein terminals of said first and second word lines arranged on said memory plane are mounted on the same side thereof.

7. The memory device according to claim 2 wherein said word selecting drive means includes a pulse transformer and drive circuit connected in series with the primary winding of said pulse transformer, one ends of said line switching circuit and of said first dummy line switching circuit are commonly connected to one terminal of the secondary winding of said pulse transformer and one ends of said second line switching circuit and of said second line switching circuit are commonly connected to the other terminal of said secondary winding.

8. The memory device according to claim 2 wherein word selecting drive means includes a pulse transformer and a word drive circuit connected in series with the primary winding of said pulse transformer, one end of said first line switching circuit and of said first dummy line switching circuit are commonly connected to one terminal of the secondary winding of said pulse transformer, the other ends of both circuits are connected to said first normal word line group and the dummy word line as well as the negative pole of a D.C. source respectively through diodes, one ends of said second line switching circuit and of said second dummy line switching circuit are commonly connected to the other terminal of said secondary winding, other end of said second line switching circuit and of said second dummy line switching circuit are connected to the second normal word line group and said dummy word line as well as the positive terminal of said D.C. source respectively through diodes.

9. The memory device according to claim 2 wherein each of said first and second plane switching circuits comprises serially connected transistors and two pulse transformers, the secondary windings thereof being connected between base and emitter electrodes of respective transistors and the secondary windings of said pulse transformers being connected in series.

10. The memory device according to claim 2 wherein both ends of said normal word line and of said dummy word line are respectively connected to said line switching circuit and said plane switching circuit respectively through diodes.

11. The memory device according to claim 2 wherein said word selecting drive circuit comprises a plane switching circuit connected between the common junction of one ends of said first normal word line group and the common junction of one ends of said second normal word line group and a plurality of transformers, one terminals of the secondary windings thereof being respectively connected to the other ends of respective word lines and the opposite terminals of said secondary windings being commonly connected.

12. The memory device according to claim 11 wherein terminals on each side of the secondary windings of at least two of said transformers are commonly connected and grounded.

13. The memory device according to claim 2 wherein each of said memory planes includes a single dummy word line and wherein said word selecting drive means comprises a first plane switching circuit connected to one end of said dummy word line, a first transformer with its secondary winding connected between other ends of said first plane switching circuit and of said dummy word line, a second plane switching circuit connected to one ends of said first and second normal word lines and a plurality of transformers, one terminals of the secondary windings of said transformers being respectively connected to the other ends of said normal word lines whereas the other terminals being commonly connected to said second plane switching circuit.

14. The memory device according to claim 13 wherein each of said first and second plane switching circuits includes two serially connected switching circuits and common junction between said two switching circuit is grounded.

References Cited

UNITED STATES PATENTS 3,144,641  8/1964  Raffel _____ 340—174

BERNARD KONICK, Primary Examiner

G. M. HOFFMAN, Assistant Examiner